United States Patent
Ishibashi

(10) Patent No.: US 10,321,314 B2
(45) Date of Patent: Jun. 11, 2019

(54) COMMUNICATION DEVICE, COMMUNICATION METHOD, AND COMMUNICATION SYSTEM

(71) Applicant: SONY MOBILE COMMUNICATIONS INC., Tokyo (JP)

(72) Inventor: Yoshihito Ishibashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 226 days.

(21) Appl. No.: 15/278,677

(22) Filed: Sep. 28, 2016

(65) Prior Publication Data

US 2017/0118641 A1 Apr. 27, 2017

(30) Foreign Application Priority Data

Oct. 23, 2015 (JP) .................... 2015-208679

(51) Int. Cl.

| H04L 9/32 | (2006.01) |
|---|---|
| H04W 12/06 | (2009.01) |
| G06F 7/58 | (2006.01) |
| H04L 9/08 | (2006.01) |
| H04L 9/14 | (2006.01) |
| H04L 29/06 | (2006.01) |
| H04W 12/04 | (2009.01) |

(52) U.S. Cl.
CPC ............ *H04W 12/06* (2013.01); *G06F 7/588* (2013.01); *H04L 9/0897* (2013.01); *H04L 9/14* (2013.01); *H04L 63/0428* (2013.01); *H04W 12/04* (2013.01)

(58) Field of Classification Search
CPC ......... G06F 7/588; H04L 9/0897; H04L 9/14; H04L 63/0428; H04W 12/04; H04W 12/06
USPC ........................................ 713/168
See application file for complete search history.

(56) References Cited

U.S. PATENT DOCUMENTS

| 6,058,477 A * | 5/2000 | Kusakabe | G06Q 20/341 380/283 |
|---|---|---|---|
| 6,747,546 B1 * | 6/2004 | Hikita | G06Q 20/341 340/10.31 |
| 8,296,566 B2 * | 10/2012 | Fontana | G06Q 20/341 380/277 |
| 8,861,723 B2 * | 10/2014 | Kambayashi | H04L 9/0897 380/44 |
| 2010/0235629 A1 * | 9/2010 | Tuda | G06Q 20/341 713/159 |

FOREIGN PATENT DOCUMENTS

JP 10-327142 12/1998

* cited by examiner

*Primary Examiner* — Samson B Lemma
(74) *Attorney, Agent, or Firm* — Xsensus LLP

(57) ABSTRACT

There is provided a communication device including: a storage unit configured to store an authentication key generated from a plurality of keys; a communication unit configured to receive authentication key identification information for specifying the authentication key; and an authentication unit configured to perform an authentication process for a transmission source of the authentication key identification information using the authentication key specified from the storage unit based on the authentication key identification information.

20 Claims, 17 Drawing Sheets

FIG. 4

| ADDRESS RANGE | STORED CONTENT | | | |
|---|---|---|---|---|
| | COMMON INFORMATION | | | |
| R1 | SERVICE CONTENT INFORMATION | DATA ID INFORMATION | SERVICE KEY INFORMATION | |
| R2 | SERVICE ID (SID) | SERVICE ID INFORMATION | NUMBER OF SERVICE IDS | SERVICE KEY (SK) |
| R3 | MACRO ID (MID) | | | MACRO KEY (MK) |
| R4 | DATA ID (DID) | DATA | | |

FIG. 5

| ADDRESS RANGE | STORED CONTENT | | | | |
|---|---|---|---|---|---|
| ... | | | | | |
| R2 | SID1 | R | DID1 | Version 1 | SK1 |
| | SID3 | R/W | DID3 | Version 1 | SK3 |
| | SID5 | R/W | DID5 | Version 2 | SK5 |
| ... | | | | | |
| R3 | MID1 | SID1, SID3, SID5 | 3 | MK1 | |
| ... | | | | | |
| R4 | DID1 | | CUSTOMER NUMBER | | |
| | DID3 | | REMAINING POINTS | | |
| | DID5 | | LOG INFORMATION | | |
| ... | | | | | |

COMMUNICATION DEVICE, COMMUNICATION METHOD, AND COMMUNICATION SYSTEM

CROSS REFERENCE TO RELATED APPLICATIONS

This application claims the benefit of Japanese Priority Patent Application JP 2015-208679 filed Oct. 23, 2015, the entire contents of which are incorporated herein by reference.

BACKGROUND

The present disclosure relates to a communication device, a communication method, and a communication system.

In recent years, with the development of information and communication technology, it has become possible to provide various services through communication. Meanwhile, there are cases in which information stored in a device is accessed through communication when a corresponding service is provided. In such a case, the communication relating to providing the service may become a cause of information leakage. For this reason, it is important to determine whether a communication counterpart is reliable as a service destination or a service source. Accordingly, authentication is used as a method of confirming a communication counterpart.

For example, JP H10-327142A discloses an invention relating to an authentication system which has a reader-writer and an integrated circuit (IC) card which perform an authentication process using a key for accessing a memory of a communication counterpart. Specifically, the reader-writer notifies the IC card of an area of a memory to be accessed and a random number generated therein, and the IC card generates a degenerate key by degenerating a key corresponding to the area of which it was notified. Next, the IC card encrypts the random number of which it was notified with the degenerate key and notifies the reader-writer of the encrypted random number. Next, the reader-writer decrypts the random number of which it was notified, and determines that the IC card is an appropriate communication counterpart, that is, the authentication has succeeded, when the decrypted random number is identical to the random number generated in the reader-writer.

SUMMARY

There is a need for further reduction in authentication time. However, in the invention disclosed in JP H10-327142A, it is difficult to further reduce authentication time. For example, in the corresponding invention, when authentication is demanded by the reader-writer, the IC card performs degeneration of the key corresponding to the area of the memory notified of by the reader-writer. For this reason, every time authentication is demanded, generation of a degenerate key is performed. In many cases, the reader-writer performs the same process every time it communicates with the IC card, and the IC card also performs the same process accordingly. As a result, with every communication with the reader-writer, the same degenerate key is generated in the IC card, and the corresponding degeneration process is repeated.

Accordingly, the present disclosure proposes a mechanism capable of further reducing authentication time.

According to an embodiment of the present disclosure, there is provided a communication device including: a storage unit configured to store an authentication key generated from a plurality of keys; a communication unit configured to receive authentication key identification information for specifying the authentication key; and an authentication unit configured to perform an authentication process for a transmission source of the authentication key identification information using the authentication key specified from the storage unit based on the authentication key identification information.

According to an embodiment of the present disclosure, there is provided a communication device including: a communication unit configured to transmit authentication key identification information for specifying an authentication key generated from a plurality of keys; and an authentication unit configured to perform an authentication process for a transmission destination of the authentication key identification information using the authentication key specified by the authentication key identification information.

According to an embodiment of the present disclosure, there is provided a communication method including: storing, by a processor, an authentication key generated from a plurality of keys; receiving, by the processor, authentication key identification information for specifying the authentication key; and performing, by the processor, an authentication process for a transmission source of the authentication key identification information using the authentication key specified based on the authentication key identification information.

According to an embodiment of the present disclosure, there is provided a communication method including: transmitting, by a processor, authentication key identification information for specifying an authentication key generated from a plurality of keys; and performing, by the processor, an authentication process for a transmission destination of the authentication key identification information using the authentication key specified by the authentication key identification information.

According to an embodiment of the present disclosure, there is provided a communication system including: a first communication device; and a second communication device. The first communication device includes a communication unit configured to transmit authentication key identification information for specifying an authentication key generated from a plurality of keys, and an authentication unit configured to perform an authentication process for a transmission destination of the authentication key identification information using the authentication key specified by the authentication key identification information, and the second communication device includes a storage unit configured to store the authentication key generated from the plurality of keys, a communication unit configured to receive the authentication key identification information for specifying the authentication key, and an authentication unit configured to perform an authentication process for a transmission source of the authentication key identification information using the authentication key specified from the storage unit based on the authentication key identification information.

As described above, according to an embodiment of the present disclosure, a mechanism capable of further reducing authentication time is provided. Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 4 is a diagram showing examples of information stored in a communication device in accordance with the first embodiment and relationships among the information;

FIG. 5 is a diagram showing examples of information stored in the communication device in accordance with the first embodiment;

DETAILED DESCRIPTION OF THE EMBODIMENT(S)

Figure 1:
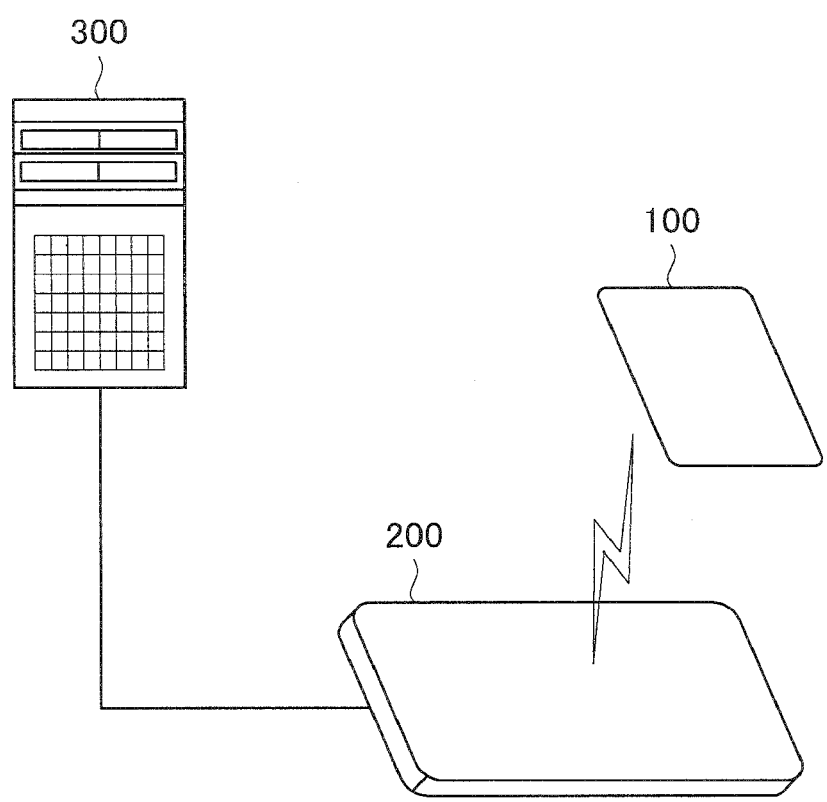
FIG. 1 is a diagram schematically showing an example of an external configuration of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be made in the following order.

1. Overview of communication system in accordance with embodiment of present disclosure
2. First embodiment of present disclosure (basic form)
  2-1. Configuration of system
  2-2. Functionality of system
  2-3. Process of system
  2-4. Summary of present embodiment
  2-5. Modified example
3. Second embodiment of present disclosure (application to entity authentication)
  3-1. Configuration of system
  3-2. Functionality of system
  3-3. Process of system
  3-4. Summary of present embodiment
4. Third embodiment of present disclosure (application to logical access control)
  4-1. Configuration of system
  4-2. Functionality of system
  4-3. Process of system
  4-4. Summary of present embodiment
5. Fourth embodiment of present disclosure (application to physical access control)
  5-1. Configuration of system
  5-2. Functionality of system
  5-3. Process of system
  5-4. Summary of present embodiment
6. Hardware configuration of communication device in accordance with embodiment of present disclosure
7. Conclusion

1. OVERVIEW OF COMMUNICATION SYSTEM IN ACCORDANCE WITH EMBODIMENT OF PRESENT DISCLOSURE

First, with reference to FIG. 1, an overview of a communication system in accordance with an embodiment of the present disclosure will be described. FIG. 1 is a diagram schematically showing an example of an external configuration of a communication system according to an embodiment of the present disclosure.

The communication system includes a plurality of communication devices which have a communication function and an authentication function. Specifically, the communication function communicates with another communication device using short-range wireless communication or human body communication. Also, the authentication function authenticates a right of a communication device which is a communication counterpart using a key. For this reason, the communication device can permit data communication of only a communication device whose authentication has ended in success. From now on, a communication device which starts an authentication process will be referred to as a master device, and a communication device which performs the authentication process based on a demand from the master device will be referred to as a slave device.

For example, as shown in FIG. 1, the communication system includes an IC card 100 which operates as a slave device and a reader-writer 200 which operates as a master device. When the IC card 100 comes within a communication range, the reader-writer 200 starts an authentication process for the IC card 100, and demands the IC card 100 to execute the authentication process. When execution of the authentication process is demanded by the reader-writer 200, the IC card 100 starts the authentication process. When the authentication process ends in success, data communication is performed between the IC card 100 and the reader-writer 200. A communication device 300 provides and updates information which is used in the authentication process of the reader-writer 200.

Here, it is preferable for communication between communication devices of the communication system to be brief. For example, the corresponding communication system is generally introduced as a ticket examination system of a station. In such a case, it is preferable to end an authentication process relating to a ticket examination for each user in a short time so that users can smoothly pass through a ticket gate. This is the same for application to cases other than a ticket examination system.

Figure 2:
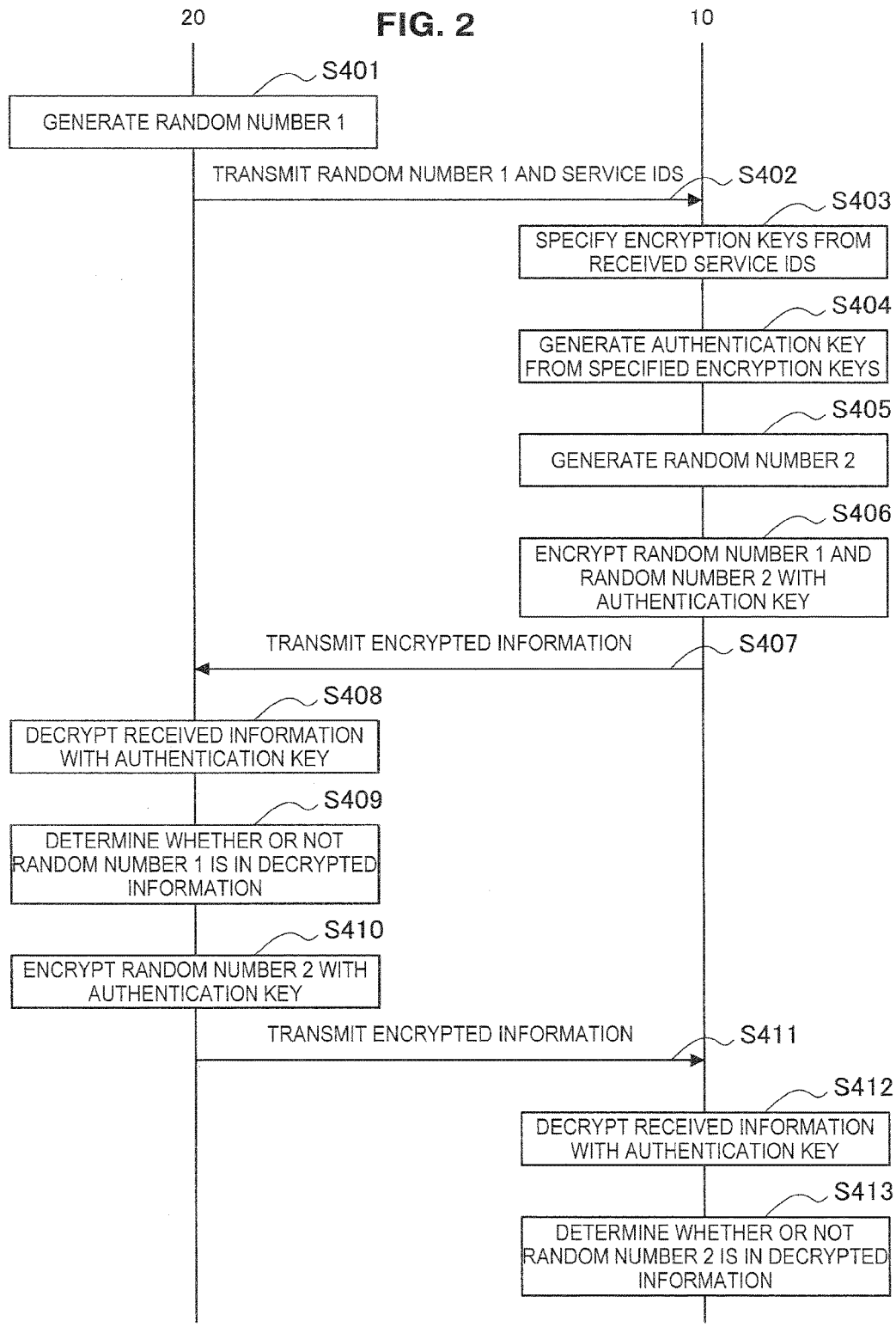
FIG. 2 is a sequence diagram conceptually showing an existing authentication process.

In relation to this, in an existing authentication process, it is difficult to further reduce authentication time. First, with reference to FIG. 2, an existing authentication process will be described. FIG. 2 is a sequence diagram conceptually showing an existing authentication process. Authentication described below is mutual authentication, and authentication of a slave device by a master device (first authentication) and authentication of the master device by the slave device (second authentication) are performed.

(First Authentication)

A reader-writer 20 which is a master device generates a random number 1 (step S401).

Next, the reader-writer 20 transmits the generated random number 1 and a service identifier (ID) to an IC card 10 which is a slave device (step S402). Here, a service ID is key identification information for specifying a key (a service key which will be described below).

The IC card 10 which has received the random number 1 and the service ID specifies the key from the received service ID (step S403). Also, correspondence between service IDs and keys is stored in the IC card 10 in advance.

Next, the IC card 10 generates an authentication key from the specified key (step S404). Specifically, the IC card 10 generates an authentication key by degenerating the specified key.

Next, the IC card 10 generates a random number 2 (step S405).

Next, the IC card 10 encrypts the random number 1 and the random number 2 with the authentication key (step S406).

Next, the IC card 10 transmits the encrypted information (step S407).

The reader-writer 20 which has received the encrypted information decrypts the received information with an authentication key (step S408). Here, the authentication key is generated in advance by degenerating the key corresponding to the service ID that the IC card 10 is notified of and stored.

Next, the reader-writer 20 determines whether or not the random number 1 is in the decrypted information (step S409). Specifically, when it is determined that the random number 1 generated by the reader-writer 20 is included in the decrypted information, the reader-writer 20 determines that the first authentication has succeeded.

(Second Authentication)

Next, the reader-writer 20 encrypts the random number 2 with the authentication key (step S410). Although it is described that second authentication is started from this step for convenience of description, the second authentication may be started from step S405.

Next, the reader-writer 20 transmits the encrypted information (step S411).

The IC card 10 which has received the encrypted information decrypts the received information with an authentication key (step S412). Here, the authentication key is the authentication key that was generated in the first authentication.

Next, the IC card 10 determines whether or not the random number 2 is in the decrypted information (step S413). Specifically, when it is determined that the random number 2 generated by the IC card 10 is included in the decrypted information, the IC card 10 determines that the second authentication has succeeded.

As described above, in the existing authentication process, generation of a degenerate key (the process of step S404) is performed every time authentication is demanded. Here, in many cases, a reader-writer performs the same process every time it communicates with an IC card, and thus an authentication key is generally generated in advance by degeneration and stored. However, in many cases, it is not possible to know what kind of process an IC card will perform together with a reader-writer, and thus it is difficult to store an authentication key in advance. For this reason, when the same authentication process is performed in an IC card a plurality of times, authentication time lengthens in the IC card, that is, not only in a communication device but also in a communication system.

Accordingly, the present disclosure proposes a communication device which stores authentication keys generated from a plurality of keys and performs an authentication process for a transmission source of received authentication key identification information using an authentication key specified based on the authentication key identification information.

For example, authentication keys are stored in the IC card 100 in advance together with authentication key identification information. Also, when authentication key identification information is received from the reader-writer 200, the IC card 100 specifies an authentication key specified by the received authentication key identification information among the stored authentication keys and performs an authentication process for the reader-writer 200 using the specified authentication key.

For this reason, by performing an authentication process using an authentication key stored in advance, it is possible to omit an authentication key generation process from the authentication process. Accordingly, it is possible to reduce time taken for the authentication process. The communication devices 100 and 200 as well as the communication system will be described in detail below. For convenience of description, communication devices 100 and 200 in accordance with first to fourth embodiments will be distinguished from each other by applying numbers corresponding to the embodiments to the ends, such as communication devices 100-1 and 200-1 to communication devices 100-4 and 200-4.

2. FIRST EMBODIMENT OF PRESENT DISCLOSURE (BASIC FORM)

The overview of a communication system in accordance with an embodiment of the present disclosure has been described above. Next, a communication system in accordance with a first embodiment of the present disclosure will be described.

2-1. Configuration of System

First, a functional configuration of the communication system in accordance with the first embodiment of the present disclosure will be described with reference to FIG.

Figure 3:
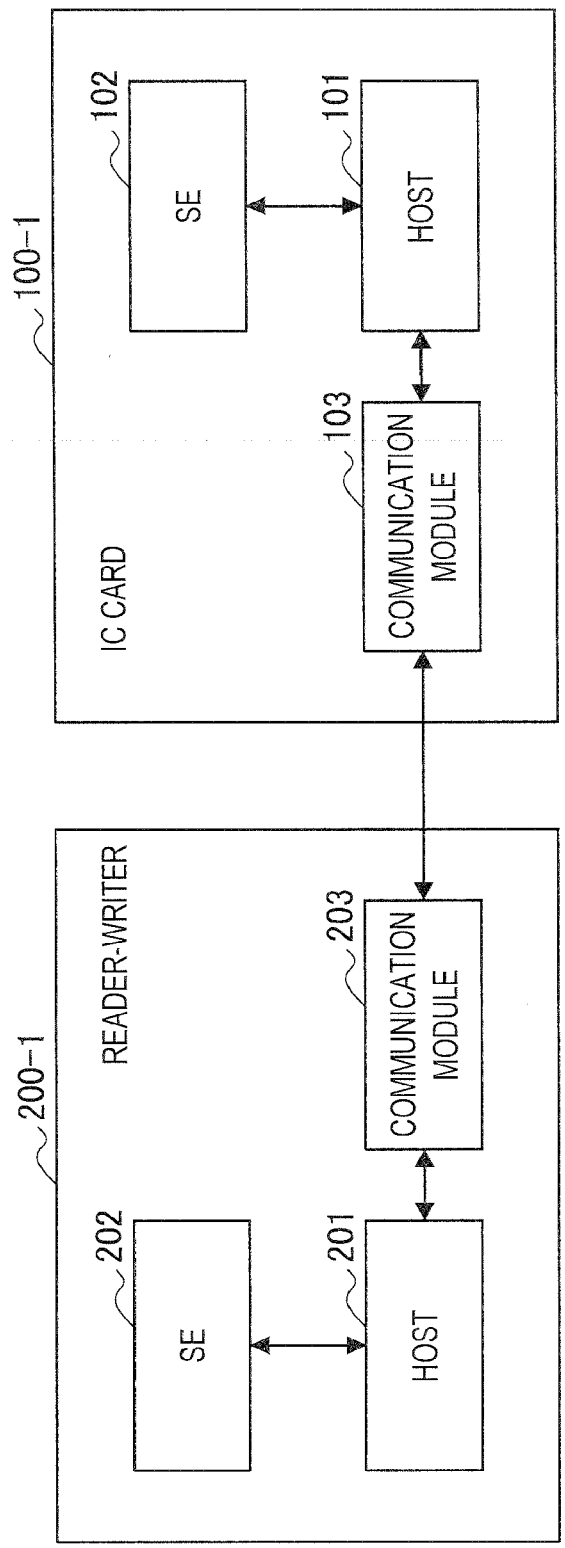
FIG. 3 is a block diagram showing an example of a schematic functional configuration of a communication system in accordance with a first embodiment of the present disclosure.

3. FIG. 3 is a block diagram showing an example of a schematic functional configuration of the communication system in accordance with the first embodiment of the present disclosure.

As shown in FIG. 3, the communication system includes an IC card 100-1 which operates as a slave device and a reader-writer 200-1 which operates as a master device.

(IC Card)

As shown in FIG. 3, the IC card 100-1 includes a host 101, a secure element (SE) 102, and a communication module 103.

The host 101 controls overall operations of the communication device 100-1. Specifically, the host 101 controls operation of the SE 102 and the communication module 103. For example, the host 101 causes the SE 102 to encrypt information and transmit the encrypted information to the communication module 103. Here, the host 101 may perform a part of an authentication process.

The SE 102 performs a process relating to security. Specifically, the SE 102 performs an authentication process, such as encryption, decryption, determination of authentication, and the like, based on an instruction of the host 101. For example, the SE 102 performs an authentication process employing a macro ID which will be described below in addition to or instead of the above-described authentication process employing a service ID. Also, the SE 102 causes information relating to security to be stored in a storage area which can be accessed by the SE 102 alone. For convenience of description, an operation of the SE 102 causing information to be stored in the storage area will be expressed as "the SE 102 stores information."

The communication module 103 communicates with another communication device. Specifically, the communication module 103 transmits information provided by the host 101 and receives information from another communication device. For example, the communication module 103 performs communication using a short-range wireless communication method, such as near field communication (NFC) or the like.

(Reader-Writer)

Since a functional configuration of the reader-writer 200-1 is substantially the same as the functional configuration of the IC card 100-1, the description will be omitted.

2-2. Functionality of System

Next, functionality of the communication system in accordance with the first embodiment of the present disclosure will be described.

(A. Authentication Employing Macro ID)

The IC card 100-1 and the reader-writer 200-1 perform authentication using an authentication key (also referred to as a macro key below) specified by a macro ID. Specifically, in the IC card 100-1, the SE 102 stores a macro key generated from a plurality of keys as a storage unit. Also, as a communication unit, the communication module 103 receives authentication key identification information (also referred to as a macro ID below) for specifying a macro key. Then, as an authentication unit, the SE 102 performs an authentication process for a transmission source of the received macro ID using the macro key specified based on the macro ID. Also, in the reader-writer 200-1, a communication module 203 transmits the macro ID of the macro key generated from the plurality of keys as a communication unit. Then, as an authentication unit, an SE 202 performs an authentication process for the transmission destination of the transmitted macro ID using the macro key specified based on the macro ID.

An authentication process for a transmission source or a transmission destination of the corresponding macro ID includes authentication of a communication device by the transmission source of the macro ID, that is, a first authentication process, and authentication of the transmission source of the macro ID by the communication device, that is, a second authentication process. Each of the first authentication and the second authentication will be described below.

(A-1. First Authentication)

First, an authentication process for the IC card 100-1 performed by the reader-writer 200-1 using a macro key specified by the corresponding communicated macro ID will be described.

The reader-writer 200-1 transmits information 1 to the IC card 100-1 as first information including a macro ID and performs an authentication process based on information 2 which is second information received from the IC card 100-1 as a response to the information 1. Specifically, the communication module 203 transmits the information 1 including the macro ID and a random number 1 which is a first random number. Also, the communication module 203 receives information 2 which has been encrypted. The SE 202 decrypts the received information 2 with a macro key and determines whether or not the random number 1 is in the information 2 obtained through the decryption.

The IC card 100-1 receives the information 1 including the macro ID from the reader-writer 200-1 and performs a process for authentication employing the macro ID. Also, the IC card 100-1 transmits the information 2 including a result of the process for the authentication to the reader-writer 200-1. Specifically, the communication module 103 receives the information 1 including the macro ID and the random number 1. Next, the SE 102 encrypts the information 2 including the random number 1 included in the received information 1 using a macro key specified based on the macro ID. Then, the communication module 103 transmits the encrypted information 2.

Further, the first authentication process will be described in detail with reference to FIGS. 4 and 5. FIG. 4 is a diagram showing examples of information stored in a communication device in accordance with the present embodiment and relationships among the information, and FIG. 5 is a diagram showing detailed examples of information stored in the communication device in accordance with the present embodiment.

First, information stored in the SE 102 (202) will be described with reference to FIG. 4. The SE 102 (202) stores information relating to a macro key and other information. Specifically, the SE 102 (202) stores common information, service information, macro information, and data information. For example, the SE 102 (202) stores the respective pieces of information mentioned above in a structure as shown in FIG. 4. For example, in a storage area of an address range R1, information used as common information in a process inside a device is stored.

In a storage area of an address range R2, service IDs (SIDs), service content information, data ID information, service key information, and service keys (SKs) are stored as service information. A service ID is information for specifying a service key and is also information for specifying a data ID to which access is permitted. Service content information is information indicating an access mode (reading (R), writing (W), or reading and writing (R/W)) for a data ID specified by a service ID. Data ID information is information indicating a data ID that can be accessed with the corresponding service key. Service key information is information relating to a service key, such as a version of the service key, an encryption algorithm, a key length, and the like. A service key (SK) is an encryption key and a decryption key.

In a storage area of an address range R3, a macro ID (MID), service ID information, the number of service IDs, and a macro key (MK) are stored as macro information. A macro ID is information for specifying a macro key. Service ID information is information indicating a service ID corresponding to a service key used for generating a macro key. The number of service IDs is information indicating the number of service IDs represented by service ID information. A macro key is an authentication key generated by degenerating a service key.

In a storage area of an address range R4, a data ID (DID) and data are stored as data information. A data ID is information for specifying data. Data is various data such as customer information, log information, or the like.

Next, the first authentication process will be described with reference to FIG. 5.

In the reader-writer 200-1, when a request for authentication with the IC card 100-1 is generated, the host 201 instructs the SE 202 to provide a macro ID and generate a random number. For example, when a request for reading out a customer number, remaining points, and log information is generated, the host 201 instructs the SE 202 to provide a macro ID corresponding to a group of SID1, SID3, and SID5 which are service IDs for accessing those pieces of data. Also, the host 201 instructs the SE 202 to generate a random number 1. When receiving the instruction, the SE 202 specifies MID1 which is the macro ID corresponding to the group of SID1, SID3, and SID5, generates a random number 1, and provides the specified MID1 and the generated random number 1 to the host 201.

Next, when the macro ID and the random number 1 are provided by the SE 202, the host 201 causes the communication module 203 to transmit information 1 including the macro ID and the random number 1.

In the IC card 100-1, when the information 1 is received, the host 101 instructs the SE 102 to encrypt information 2 including the random number 1 included in the information 1 based on the macro ID included in the information 1. For example, when the information 1 is received by the communication module 103, the host 101 provides the information 1 to the SE 102 and instructs the SE 102 to encrypt the information 2 including the random number 1 included in the information 1 based on MID1 included in the information 1. When the instruction is received, the SE 102 acquires a macro key MK1 corresponding to MID 1 from stored macro information and encrypts the information 2 including the provided random number 1 with MK1.

Next, when the encrypted information 2 is provided by the SE 102, the host 101 causes the communication module 103 to transmit the encrypted information 2.

In the reader-writer 200-1, when the information 2 is received, the host 201 causes the SE 202 to determine an authentication result for the IC card 100-1 based on the information 2. For example, when the information 2 is received by the communication module 203, the host 201 provides the information 2 to the SE 202 and instructs the SE 202 to determine an authentication result for the IC card 100-1 based on the information 2. When the instruction is received, the SE 202 acquires MK1 corresponding to MID1 and decrypts the provided information 2 with MK1. Also, the SE 202 determines whether or not the random number 1 is in the information 2 obtained through the decryption. When it is determined that the random number 1 is included, the SE 202 determines that the authentication for the IC card 100-1 has succeeded. Also, when it is determined that the random number 1 is not included, the SE 202 determines that the authentication for the IC card 100-1 has failed. The determination result is provided to the host 201.

(A-2. Second Authentication)

Next, an authentication process for the reader-writer 200-1 performed by the IC card 100-1 using a macro key specified by the corresponding communicated macro ID will be described.

The IC card 100-1 transmits the information 2 to the reader-writer 200-1 and performs an authentication process based on information 3 which is third information received from the reader-writer 200-1 as a response to the information 2. Specifically, the SE 102 generates a random number 2 as a second random number. Next, the communication module 103 transmits the information 2 including the random number 2. The SE 102 decrypts the information 3 received by the communication module 103 with a specified macro key and determines whether or not the random number 2 is in the information 3 obtained through the decryption.

The reader-writer 200-1 receives the information 2 from the IC card 100-1 and performs a process for authentication based on the information 2. Then, the reader-writer 200-1 transmits the information 3 including a result of the process for the authentication to the IC card 100-1. Specifically, the communication module 203 receives the information 2 including the random number 2. Next, the SE 202 encrypts the information 3 including the random number 2 included in the received information 2 using a macro key specified by a macro ID that the IC card 100-1 has been notified of. The communication module 203 transmits the encrypted information 3.

Further, the second authentication process will be described in detail with reference to FIG. 5.

In the IC card 100-1, when a request for authentication with the reader-writer 200-1 is generated, a host 101 instructs the SE 102 to generate a random number. For example, when the information 1 is received as a demand for authentication from the reader-writer 200-1, the host 101 instructs the SE 102 to generate the random number 2. When the instruction is received, the SE 102 generates and retains the random number 2 therein.

When the random number 2 is generated, the host 101 instructs the SE 102 to encrypt the information 2 including the random number 1 and the random number 2 based on the macro ID included in the information 1. For example, the host 101 instructs the SE 102 to encrypt the information 2 including the random number 1 and the random number 2 based on MID1. When the instruction is received, the SE 102 encrypts the information 2 with MK1 specified by MID1 and provides the encrypted information 2 to the host 101.

Next, when the encrypted information 2 is provided by the SE 102, the host 101 causes the communication module 103 to transmit the encrypted information 2.

In the reader-writer 200-1, when the information 2 is received, the host 201 instructs the SE 202 to encrypt the information 3 including the random number 2 included in the information 2 based on the macro ID of which it is notified. For example, when the information 2 is received by the communication module 203, the host 201 provides the information 2 to the SE 202 and instructs the SE 202 to encrypt the information 3 including the random number 2 included in the information 2 based on MID1 that the IC card 100-1 has been notified of. When the instruction is received, the SE 202 acquires MK1 corresponding to MID1 from stored macro information and decrypts the provided information 2 with MK1. Also, with MK1, the SE 202 encrypts the information 3 including the random number 2 included in the information 2 obtained through the decryption.

Next, when the encrypted information 3 is provided by the SE 202, the host 201 causes the communication module 203 to transmit the encrypted information 3.

In the IC 100-1, when the information 3 is received, the host 101 causes the SE 102 to determine an authentication result for the reader-writer 200-1 based on the information 3. For example, when the information 3 is received by the communication module 103, the host 101 provides the information 3 to the SE 102 and instructs the SE 102 to determine an authentication result for the reader-writer 200-1 based on the information 3. When the instruction is received, the SE 102 acquires MK1 corresponding to MID1 and decrypts the provided information 3 with MK1. Also, the SE 102 determines whether or not the random number 2 is in the information 3 obtained through the decryption. When it is determined that the random number 2 is included, the SE 102 determines that the authentication for the reader-writer 200-1 has succeeded. Also, when it is determined that the random number 2 is not included, the SE 102 determines that the authentication for the reader-writer 200-1 has failed. The determination result is provided to the host 101.

(B. Registration of Macro ID)

When the reader-writer 200-1 transmits a demand for macro registration, the IC card 100-1 registers macro information based on the demand for macro registration. Specifically, the communication module 203 transmits a demand for macro registration as a demand for authentication key registration including service IDs and a macro ID. When the demand for macro registration is received, the SE 102 generates a macro key from service keys specified by the service IDs. Also, the SE 102 stores the generated macro key.

More specifically, in the reader-writer 200-1, the host 201 generates a demand for macro registration. For example, the host 201 acquires the service IDs for specifying the service keys for generating the macro key desired to be registered. Also, the host 201 acquires the macro ID for specifying the macro key desired to be registered. Then, the host 201 generates the demand for macro registration including the acquired service IDs and macro ID. Here, the demand for macro registration may additionally include information for specifying a degeneration sequence of the service keys in generation of the macro key.

Figure 6:
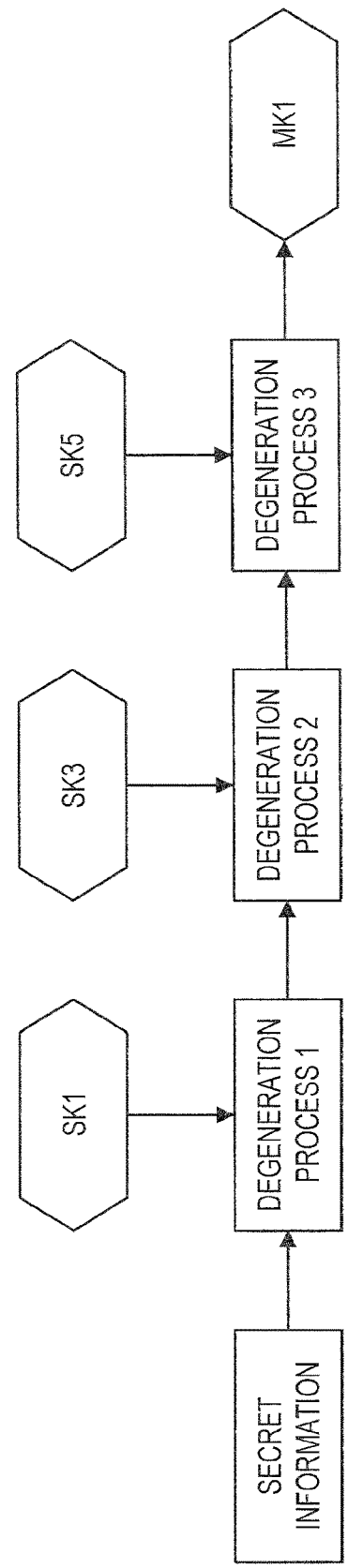
FIG. 6 is a diagram illustrating a degeneration process of generating a macro key from service keys.

The SE 202 registers the macro information included in the demand for macro registration therein. For example, the SE 202 generates the macro key by degenerating the service keys specified by the service IDs included in the demand for macro registration. Then, the SE 202 stores the service IDs and the number of the service IDs together with the generated macro key and the macro ID as macro information. Further, a process of generating a macro key will be described in detail with reference to FIG. 6. FIG. 6 is a diagram illustrating a degeneration process of generating a macro key from service keys.

The SE 202 generates a macro key by repeating a degeneration process for a plurality of service IDs. For example, as shown in FIG. 6, the SE 202 performs a degeneration process 1 employing secret information and SK1 as inputs, a degeneration process 2 employing an output of the degeneration process 1 and SK3 as inputs, and a degeneration process 3 of inputting an output of the degeneration process 2 and SK5. Then, an output MK1 of the degeneration process 3 is used as a macro key. Although secret information is used as an input of the degeneration process 1 in the example of FIG. 6, another service key may be used as an input instead of the secret information, and the number of processing stages may be reduced by performing the degeneration process 1 employing SK1 as secret information and employing SK3 as an input.

Here, the macro ID included in the demand for macro registration does not overlap macro IDs which have been being used already. For example, macro IDs are managed by a management server or the like which is connected to the reader-writer 200-1 through communication, and when registration of a macro key is newly desired, a macro ID may be issued at the management server. Also, information including the service IDs and the macro ID included in the demand for macro registration may be generated by the management server, and the reader-writer 200-1 may generate the demand for macro registration based on the information.

The demand for macro registration includes determination information for determining the validity of the demand for macro registration, the determination information being generated for information included in the demand for macro registration. For example, the host 201 acquires a check code generated by encrypting service IDs and the number of services included in macro registration information with a predetermined key 1 and includes the check code in the demand for macro registration. Also, the service IDs and the number of services are encrypted with a predetermined key 2, and the encrypted information is included in the demand for macro registration. The macro ID may be plain text. The predetermined key 1 and the predetermined key 2 are also retained in the IC card 100-1. Also, the check code may be generated by the management server and provided to the reader-writer 200-1.

Next, the host 201 causes the communication module 203 to transmit the generated demand for macro registration.

In the IC card 100-1, when the demand for macro registration is received, the host 101 causes the SE 102 to determine the validity of the demand for macro registration. For example, when the demand for macro registration is received by the communication module 103, the host 101 instructs the SE 102 to determine the validity of the demand for macro registration. When the instruction is received, the SE 102 decrypts the encrypted information included in the demand for macro registration with the predetermined key 2 and generates a code by encrypting, with the predetermined key 1, the service IDs and the number of services obtained through the decryption. Then, the SE 102 determines whether the check code included in the demand for macro registration is identical to the generated code, and determines that the macro ID and the service IDs are valid when the check code is identical to the generated code.

Next, the SE 102 registers the macro information. For example, when the validity of the demand for macro registration is confirmed, the SE 102 specifies the service keys from the service IDs included in the demand for macro registration and generates the macro key by degenerating the specified service keys. Then, the SE 102 stores macro information such as the generated macro key, the macro ID, the service IDs, and the like. When the validity of the check code is not confirmed, a designated service ID is unregistered, or the designated macro ID has been registered already, the SE 102 returns an error to the host 101 and stops storage of the macro information. Only when the macro information is stored in success, the host 101 is notified of a determination result that the demand for macro registration is valid.

Next, when the registration of macro information is completed, the host 101 causes the communication module 103 to transmit a response to the demand for macro registration.

In the reader-writer 200-1, when the response to the demand for macro registration is received, the host 201 ends the process relating to the demand for macro registration. Also, when the response is not received until a predetermined time elapses after the transmission of the demand for macro registration, the reader-writer 200-1 may retransmit the demand for macro registration.

Although an example in which a demand for macro registration is transmitted with a part thereof encrypted has been described above, a demand for macro registration may be transmitted in plain text.

Also, although an example in which service IDs for specifying service keys used for generating a macro key have been registered already in the IC card 100-1 has been described, when a service ID is unregistered, the service ID may be registered before registration of a macro ID. For example, a demand for service registration including a service ID and a temporary service key is generated at a reader-writer for registration and transmitted from the reader-writer for registration to the IC card 100-1. The IC card 100-1 registers the service ID and the temporary service key included in the demand for service registration. Next, authentication is performed between the reader-writer for registration and the IC card 100-1 using the temporary service key, and when the authentication succeeds, a demand for a service key change including a service key is transmitted from the reader-writer for registration to the IC card 100-1. The IC card 100-1 registers the service key included in the demand for a service key change in replacement of the temporary service key. Here, the reader-writer for registration may be the aforementioned management server.

Further, although it has been described above that a macro key (authentication key) has been stored already in the reader-writer 200-1, the authentication key may be registered through communication from the aforementioned management server. For example, first, service IDs for authentication employing a macro key are registered like in the IC card 100-1. After that, a temporary key associated with service IDs for authentication employing the corresponding macro key is updated with the macro key.

2-3. Process of System

Next, processes of the communication system in accordance with the present embodiment will be described.
(A. Authentication Process Employing Macro ID)

Figure 7:
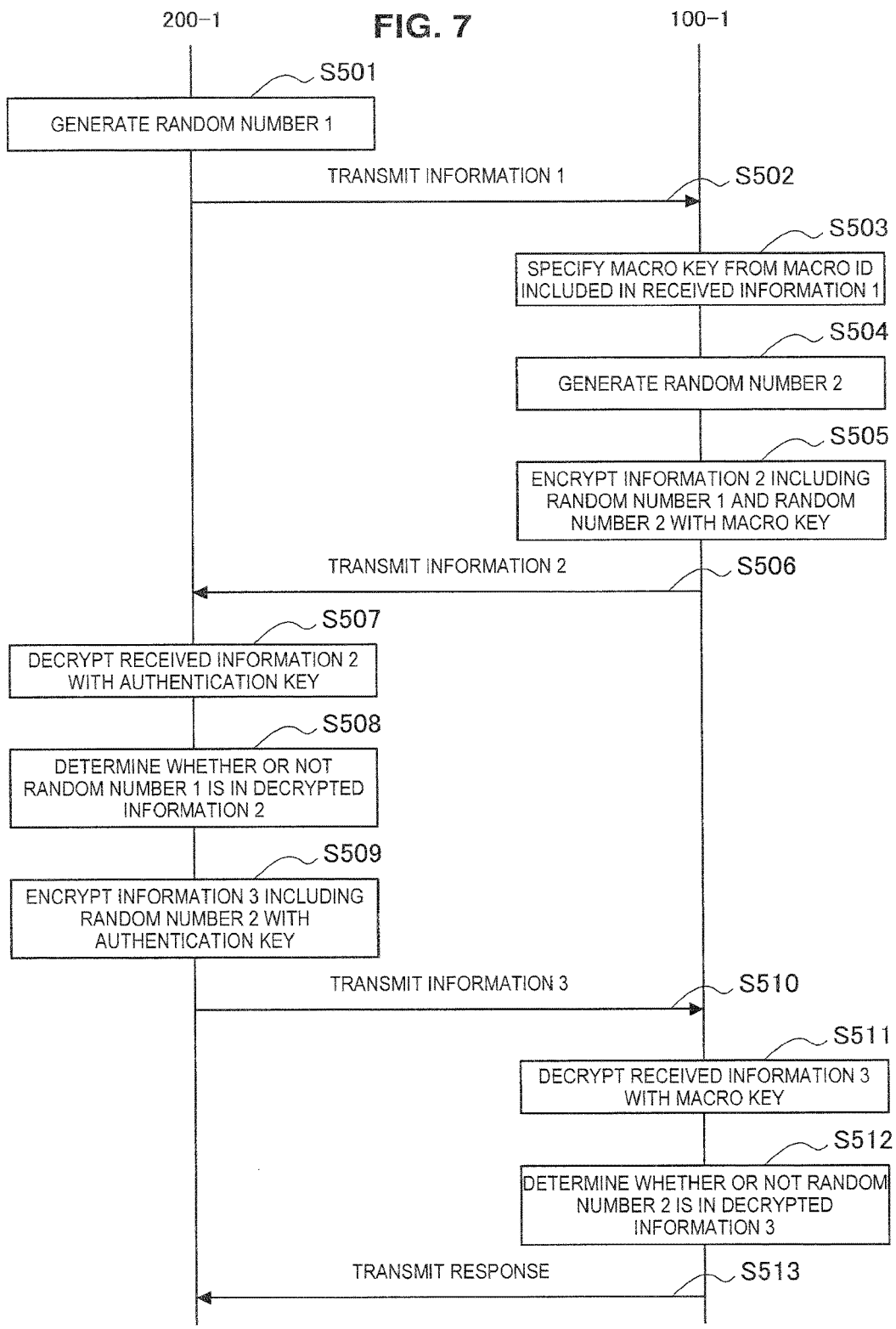
FIG. 7 is a sequence diagram conceptually showing an authentication process employing a macro ID of the communication system in accordance with the first embodiment.

First, an authentication process employing a macro ID of a communication system in accordance with the present embodiment will be described with reference to FIG. 7. FIG. 7 is a sequence diagram conceptually showing an authentication process employing a macro ID of the communication system in accordance with the present embodiment.

When an authentication request is generated, the reader-writer 200-1 generates a random number 1 (step S501). Specifically, when a request for authentication with the IC card 100-1 is generated, the host 201 causes the SE 202 to generate the random number 1. Then, the host 201 designates service IDs which specify a key for authentication with the IC card 100-1 (referred to as an authentication key on the reader-writer side and is a key corresponding to a macro key on the side of the IC card 100-1).

Next, the reader-writer 200-1 transmits information 1 including a macro ID and the random number 1 (step S502). Specifically, the host 201 causes the communication module 203 to transmit the information 1 including the macro ID specified by the designated service IDs and the random number 1 generated by the SE 202.

The IC card 100-1 which has received the information 1 specifies a macro key from the received macro ID (step S503). Specifically, when the information 1 is received by the communication module 103, the host 101 provides the macro ID included in the information 1 to the SE 102. The SE 102 specifies the macro key corresponding to the macro ID provided from the stored macro information.

Next, the IC card 100-1 generates a random number 2 (step S504). Specifically, the host 101 causes the SE 102 to generate the random number 2.

Next, the IC card 100-1 encrypts information 2 including the random number 1 and the random number 2 with the macro key (step S505). Specifically, the SE 102 encrypts the information 2 including the random number 1 and the random number 2 with the specified macro key and provides the encrypted information 2 to the host 101.

Next, the IC card 100-1 transmits the information 2 (step S506). Specifically, the host 101 causes the communication module 103 to transmit the information 2 provided by the SE 102.

The reader-writer 200-1 which has received the information 2 decrypts the received information 2 with the authentication key (step S507). Specifically, when the information 2 is received by the communication module 203, the host 201 provides the information 2 to the SE 202. The SE 202 decrypts the information 2 with the authentication key specified by the service IDs designated in step S501.

Next, the reader-writer 200-1 determines whether or not the random number 1 is in the decrypted information 2 (step S508). Specifically, the SE 202 determines whether the random number 1 is included in the decrypted information 2. When the random number 1 is included, the SE 202 determines that authentication of the IC card 100-1 has succeeded. The host 201 is notified of the determination result.

Next, the reader-writer 200-1 encrypts information 3 including the random number 2 with the authentication key (step S509). Specifically, when it is notified by the SE 202 that the authentication of the IC card 100-1 has succeeded, the host 201 instructs the SE 202 to encrypt the information 3. When the instruction is received, the SE 202 encrypts the information 3 including the random number 2 with the authentication key which has been used to decrypt the information 2. Then, the encrypted information 3 is provided to the host 201.

Next, the reader-writer 200-1 transmits the information 3 (step S510). Specifically, the host 201 causes the communication module 203 to transmit the encrypted information 3.

The IC card 100-1 which has received the information 3 decrypts the received information 3 with the macro key (step S511). Specifically, when the information 3 is received by the communication module 103, the host 101 provides the information 3 to the SE 102. The SE 102 decrypts the provided information 3 with the macro key which has been used to encrypt the information 2.

Next, the IC card 100-1 determines whether or not the random number 2 is in the decrypted information 3 (step S512). Specifically, the SE 102 determines whether the random number 2 is included in the decrypted information 3. When the random number 2 is included, the SE 102 determines that authentication of the reader-writer 200-1 has succeeded. The host 101 is notified of the determination result.

Next, the IC card 100-1 transmits a response (step S513). Specifically, when it is notified by the SE 102 that the authentication of the reader-writer 200-1 has succeeded, the host 101 causes the communication module 103 to transmit a response to the information 1 or the information 3.

Although an example in which only an authentication process is performed has been described above, secret communication may be performed after the authentication process. For example, the reader-writer 200-1 includes a key for secret communication (referred to as a session key below) in the information 3 which is transmitted after the first authentication is completed. Then, the IC card 100-1 and the reader-writer 200-1 communicate using the session key after the second authentication is completed.

(B. Macro ID Registration Process)

Figure 8:
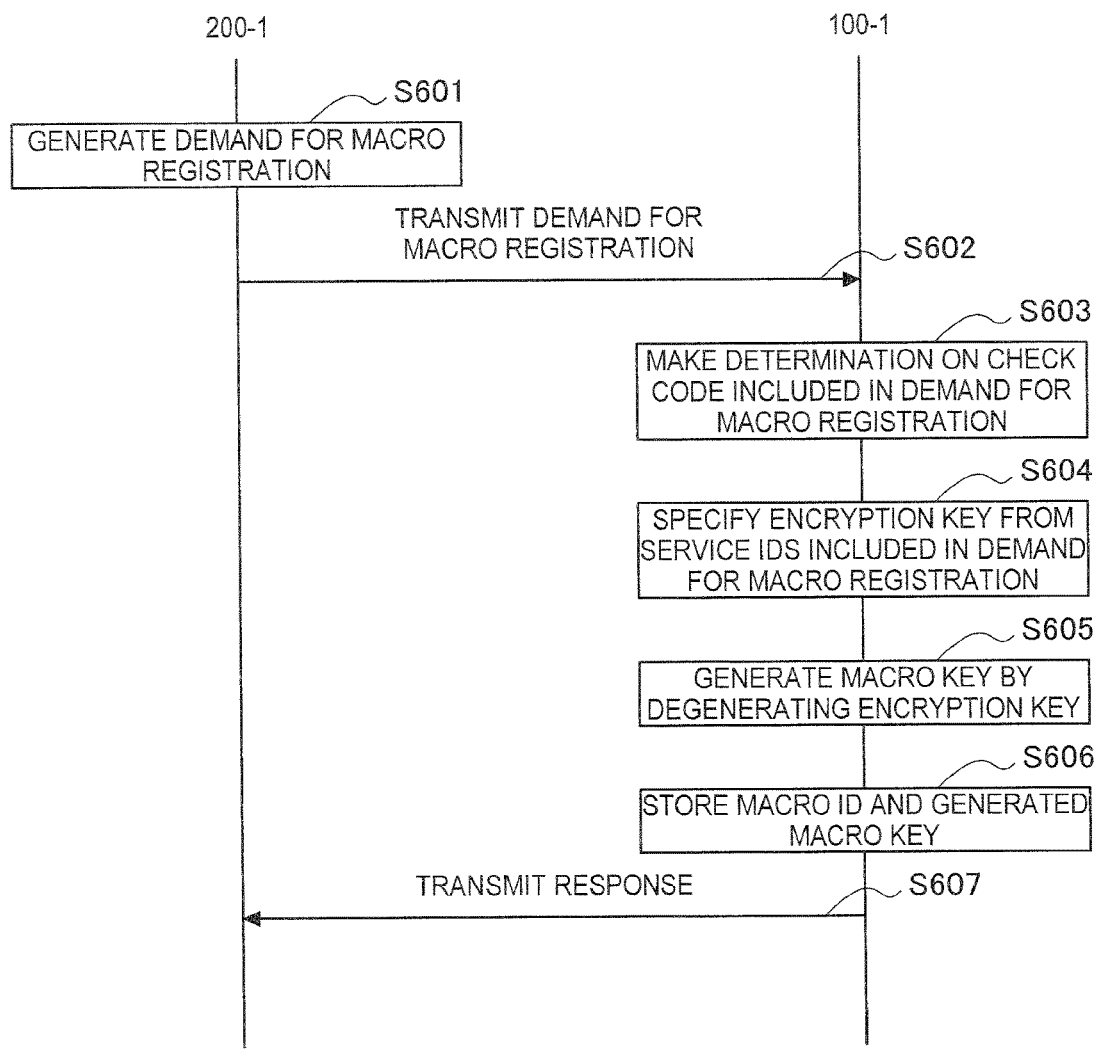
FIG. 8 is a sequence diagram conceptually showing a macro ID registration process of the communication system in accordance with the first embodiment.

Next, a macro ID registration process of the communication system in accordance with the present embodiment will be described with reference to FIG. 8. FIG. 8 is a sequence diagram conceptually showing a macro ID registration process of the communication system in accordance with the present embodiment.

The reader-writer 200-1 generates a demand for macro registration (step S601). Specifically, when a macro registration request is generated, the host 201 acquires a macro ID for specifying a macro key desired to be registered, a check code generated by encrypting service IDs for generating the macro key and the number of services with a predetermined key 1, and information generated by encrypting the service IDs for specifying service keys for generating the macro key and the number of services with a predetermined key 2. Then, the host 201 generates the demand for macro registration including the service IDs, that is, the macro ID with respect to the IC card 100-1, the check code, and the encrypted information.

Next, the reader-writer 200-1 transmits the demand for macro registration (step S602). Specifically, the host 201 causes the communication module 203 to transmit the generated demand for macro registration.

The IC card 100-1 which has received the demand for macro registration makes a determination of the check code included in the demand for macro registration (step S603). Specifically, when the demand for macro registration is received by the communication module 103, the host 101 provides the demand for macro registration to the SE 102. The SE 102 decrypts the encrypted information included in the provided demand for macro registration with the predetermined key 2, encrypts the service IDs and the number of services obtained through the decryption with the predetermined key 1, and determines whether a code obtained through the encryption and the check code included in the demand for macro registration are identical to each other. When the code is identical to the check code, the SE 102 determines that the macro ID and the service IDs are valid information. The host 101 is notified of the determination result.

Next, the IC card 100-1 specifies keys from the service IDs included in the demand for macro registration (step S604). Specifically, when the macro ID and the service IDs included in the demand for macro registration are valid information, the SE 102 specifies the service keys from the service IDs.

Next, the IC card 100-1 generates the macro key by degenerating the key (step S605). Specifically, the SE 102 generates the macro key by degenerating the specified service keys in a degeneration sequence specified by an alignment sequence of the service IDs.

Next, the IC card 100-1 stores the macro ID and the generated macro key (step S606). Specifically, the SE 102 stores the generated macro key, the macro ID included in the demand for macro registration, and the service IDs for specifying the service keys for generating the macro key. When the storage of the macro key and the like, that is, registration of macro information, is completed, the host 101 is notified of the completion of macro registration.

Next, the IC card 100-1 transmits a response (step S607). Specifically, when the host 101 is notified of the completion of macro registration, the host 101 causes the communication module 103 to transmit the response to the demand for macro registration.

2-4. Summary of Present Embodiment

As described above, according to the first embodiment of the present disclosure, the communication device 100-1 stores a macro key generated from a plurality of service keys and receives a macro ID for specifying the macro key. Then, the communication device 100-1 performs an authentication process for a transmission source of the macro ID using the macro key specified based on the macro ID. Also, the communication device 200-1 transmits the macro ID for specifying the macro key, stores an authentication key corresponding to the macro key, and performs an authentication process for a transmission destination of the macro ID using the stored authentication key. For this reason, by performing the authentication processes using the macro key stored in advance, it is possible to omit a macro key generation process from the authentication process. Accordingly, it is possible to reduce time taken for the authentication process. In related art, a plurality of service IDs are provided to generate a macro key. In contrast, according to the present embodiment, one macro ID instead of a plurality of service IDs is provided. Since the macro ID has less amount of information than the plurality of service IDs, the amount of communication is reduced. Accordingly, it is possible to reduce communication time taken to provide information for generating the macro key.

The authentication process includes a process for the transmission source of the macro ID to authenticate the communication device 100-1. For this reason, by performing a process for the communication counterpart to authenticate the communication device 100-1, that is, first authentication, using the macro ID, it is possible to reduce time taken for the first authentication compared to related art.

The macro ID is included in received first information, and the communication device 100-1 encrypts second information including the first random number included in the first information with the specified macro key and transmits the encrypted second information. For this reason, using a determination of coincidence between random values in authentication, it is possible to improve the safety of information communication compared to a case of using a fixed value in authentication.

The authentication process includes a process for the communication device 100-1 to authenticate the transmission source of the macro ID. For this reason, by performing a process for the communication device 100-1 to authenticate the communication counterpart, that is, second authentication, using the macro ID, it is possible to reduce time taken for the second authentication compared to related art. Also, when the first authentication and the second authentication, that is, mutual authentication, is performed, it is possible to improve the safety of information communication compared to a case of performing unidirectional authentication.

The communication device 100-1 generates a second random number, transmits the second information including the second random number, decrypts received third information with the specified macro key, and determines whether or not the second random number is in the third information obtained through the decryption. For this reason, using a determination of coincidence between random values in authentication, it is possible to improve the safety of information communication compared to a case of using a fixed value.

When the service IDs for specifying the service keys and a demand for macro registration including the macro ID are received, the macro key is generated from the service keys specified by the service IDs, and the communication device 100-1 stores the generated macro key. Also, the communication device 200-1 transmits the demand for macro registration including the service IDs and the macro ID. For this reason, by registering macro information based on the demand, the demanding side can manage the macro information registered in the communication device 100-1. Accordingly, it becomes possible to efficiently use a limited storage capacity of the communication device 100-1. In particular, when the communication device 100-1 is a portable device having a smaller storage capacity than a fixed device, the present configuration is meaningful.

The demand for macro registration includes determination information for determining the validity of information, the determination information being generated for the macro ID and the service IDs included in the demand for macro registration. For this reason, it is possible to prevent a macro from being registered in the communication device 100-1 which is not a target of registration. Accordingly, it is possible to prevent occurrence of a useless process and a leakage of information, such as a macro ID and the like, in the communication device 100-1 which is not a target of registration.

When the authentication process succeeds, the IC card 100-1 permits the reader-writer 200-1 to access data which is made to correspond to the service IDs for specifying the service keys. Also, when the authentication process succeeds, the reader-writer 200-1 accesses the data stored in the IC card 100-1. For this reason, a process of determining access permission to data retained in the IC card 100-1 is performed at the same time as the authentication process employing the macro ID. Accordingly, compared to a case in which the access permission determining process is performed after the authentication process, it is possible to efficiently perform data access of the reader-writer 200-1 to the IC card 100-1 with a security level maintained.

The macro ID included in the demand for macro registration does not overlap macro IDs which have been being used already. For this reason, it is possible to prevent authentication failure caused by duplication of the macro ID or unintended success in authentication.

2-5. Modified Example

The first embodiment of the present disclosure has been described above. The present embodiment is not limited to the example described above. First and second modified examples of the present embodiment will be described below.

First Modified Example

Figure 9:
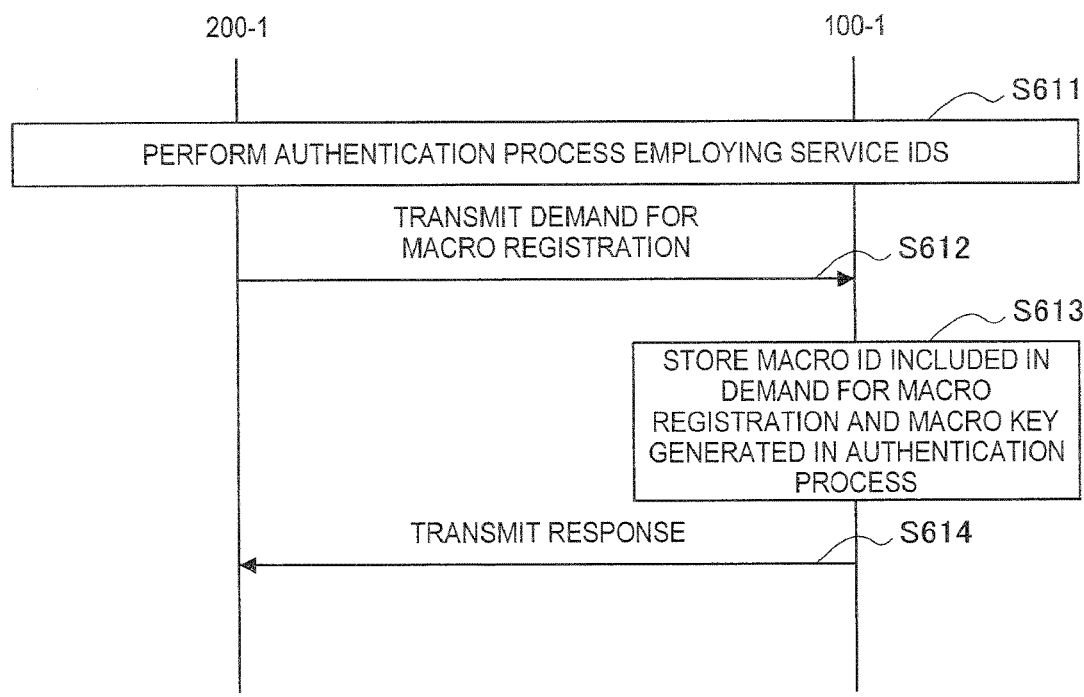
FIG. 9 is a sequence diagram conceptually showing a macro ID registration process of a communication system in accordance with a first modified example of the first embodiment.

In a first modified example of the present embodiment, after the authentication process employing service IDs, the communication device 100-1 may register a macro key generated in the authentication process. Specifically, the SE 102 performs the authentication process using the macro key generated based on the received service IDs and stores the macro key generated in the authentication process. More specifically, based on reception of a demand for macro registration, the SE 102 stores the macro key generated in the authentication process employing the service IDs. Further, a process of the present modified example will be described in detail with reference to FIG. 9. FIG. 9 is a sequence diagram conceptually showing a macro ID registration process of a communication system in accordance with a first modified example of the present embodiment.

First, the IC card 100-1 and the reader-writer 200-1 execute an authentication process employing service IDs (step S611). Specifically, the reader-writer 200-1 provides the service IDs, and the IC card 100-1 generates a macro key by degenerating service keys specified by the provided service ID. Then, the authentication process is performed using the macro key and a random number at the reader-writer 200-1 and the IC card 100-1.

Next, the reader-writer 200-1 transmits a demand for macro registration (step S612). Specifically, when a response regarding the authentication process is received by the communication module 203, the host 201 determines whether or not to register macro information. When it is determined to register macro information, the host 201 causes the communication module 203 to transmit the demand for macro registration including a macro ID. Since the authentication process has been already completed, it is optional whether or not the service IDs for specifying the service keys for generating the macro key, information corresponding to the number of services, and a check code are included.

The IC card 100-1 which has received the demand for macro registration stores the macro ID included in the demand for macro registration and the macro key generated in the authentication process (step S613). Specifically, when the demand for macro registration is received by the communication module 103, the host 101 provides the demand for macro registration to the SE 102. The SE 102 stores the macro ID included in the provided demand for macro registration, the macro key generated in the authentication process performed in advance of the demand for macro registration, and the service IDs received in step S611. Then, the host 101 is notified of completion of the registration.

Next, the IC card 100-1 transmits a response (step S614). Specifically, when the host 101 is notified of the completion of registration, the host 101 causes the communication module 103 to transmit the response to the demand for macro registration.

Figure 10:
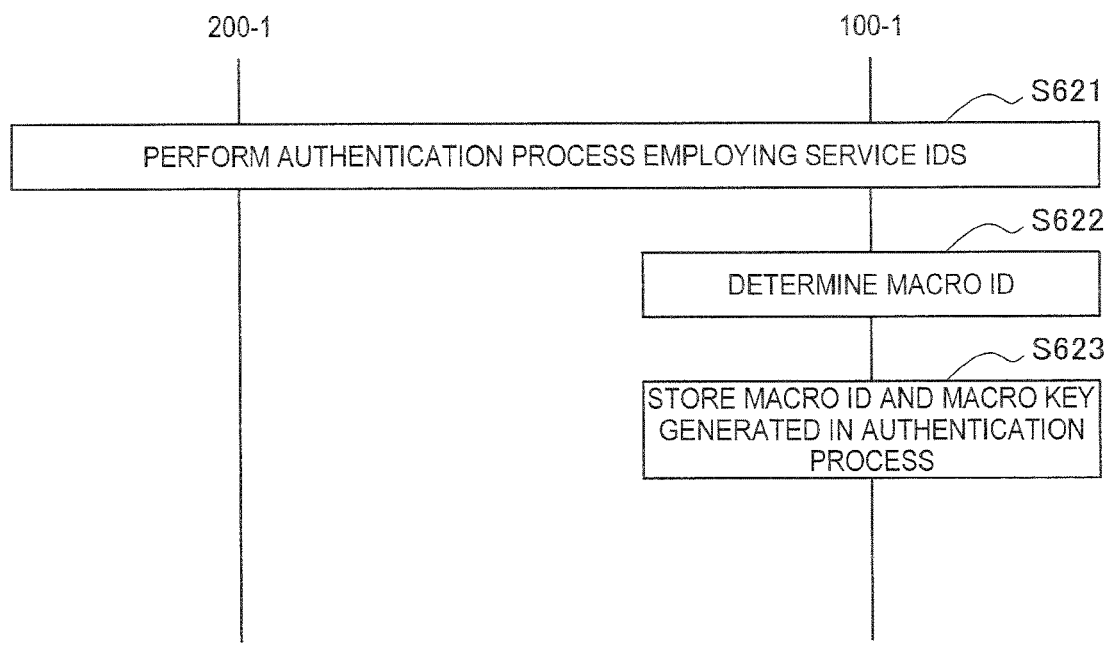
FIG. 10 is a sequence diagram conceptually showing another example of a macro ID registration process of the communication system in accordance with the first modified example of the first embodiment.

Also, the SE 102 may store the macro key generated in the authentication process employing the service IDs without receiving the demand for macro registration. Specifically, based on generation of the macro key, the SE 102 stores the generated macro key. Further, another process of the present modified example will be described in detail with reference to FIG. 10. FIG. 10 is a sequence diagram conceptually showing another example of a macro ID registration process of the communication system in accordance with the first modified example of the present embodiment. Description of a process which is substantially the same as the process described above will be omitted.

First, the IC card 100-1 and the reader-writer 200-1 execute an authentication process employing service IDs (step S621).

Next, the IC card 100-1 determines a macro ID (step S622). Specifically, when the authentication process is completed, the host 101 instructs the SE 102 to register macro information. When the instruction is received, the SE 102 determines the macro ID for specifying a macro key generated in the authentication process.

Next, the IC card 100-1 stores the macro ID, the macro key generated in the authentication process, and the service IDs (step S623). Specifically, the SE 102 stores the determined macro ID, the macro key generated in the authentication process, and the service IDs designated to generate the macro key. The host 101 is notified that registration has been completed.

In this way, according to the first modified example of the present embodiment, the communication device 100-1 performs an authentication process using a macro key generated based on received service IDs and stores the macro key generated in the authentication process. For this reason, by registering a macro key at the timing at which the macro key is generated, it is possible to register only macro keys of which needs for the use have been actually confirmed. Accordingly, it becomes possible to efficiently use a limited storage capacity of the communication device 100-1.

Also, based on reception of a demand for macro registration, the communication device 100-1 stores the macro key generated in the authentication process employing the service IDs. For this reason, a macro key is registered based on an explicit demand for registration, so that a registration demanding side can manage the registered macro key.

Further, the communication device 100-1 stores the macro key generated in the authentication process employing the service IDs regardless of a demand for macro registration. In this case, although there is no demand for macro registration, the macro key is registered, and thus it is possible to omit the communication of a demand for macro registration and a response to the demand for macro registration. Accordingly, it is possible to reduce the amount of communication and macro registration processing time including communication time.

Second Modified Example

In a second modified example of the present embodiment, IC card 100-1 may delete macro information. Specifically, the SE 102 deletes a macro key when a predetermined condition is satisfied. More specifically, when a storage capacity reaches a predetermined amount, the SE 102 deletes the macro information including the macro key. For example, the SE 102 may sequentially delete macro information in decreasing order of elapsed time in the storage or may delete macro information in accordance with the number of use of a macro key.

Also, the SE 102 may delete macro information based on reception of a demand for macro deletion. For example, a demand for macro deletion including a macro ID of macro information desired to be deleted is transmitted from the reader-writer 200-1. In the IC card 100-1, when the demand for macro deletion is received, the host 101 instructs the SE 102 to delete macro information relating to the macro ID included in the demand for macro deletion. When the instruction is received, the SE 102 specifies macro information using the macro ID included in the demand for macro deletion and deletes the specified macro information. Then, when the deletion of macro information is completed, the host 101 causes the communication module 103 to transmit a response to the demand for macro deletion. When the response is received, the reader-writer 200-1 considers that the macro information has been deleted and ends the process relating to the demand for macro deletion.

In this way, according to the second modified example of the present embodiment, the communication device 100-1 deletes a macro key when a predetermined condition is assumed. For this reason, it is possible to efficiently use a limited storage capacity of the communication device 100-1. Also, since macro keys not in use do not exist, it is possible to suppress a leakage of macro information caused by the loss of the communication device 100-1 and the like.

3. SECOND EMBODIMENT OF PRESENT DISCLOSURE (APPLICATION TO ENTITY AUTHENTICATION)

The communication system in accordance with the first embodiment of the present disclosure has been described above. Next, a communication system in accordance with a second embodiment of the present disclosure will be described. The communication system in accordance with the present embodiment has a function of performing entity authentication using a key.

3-1. Configuration of System

Figure 11:
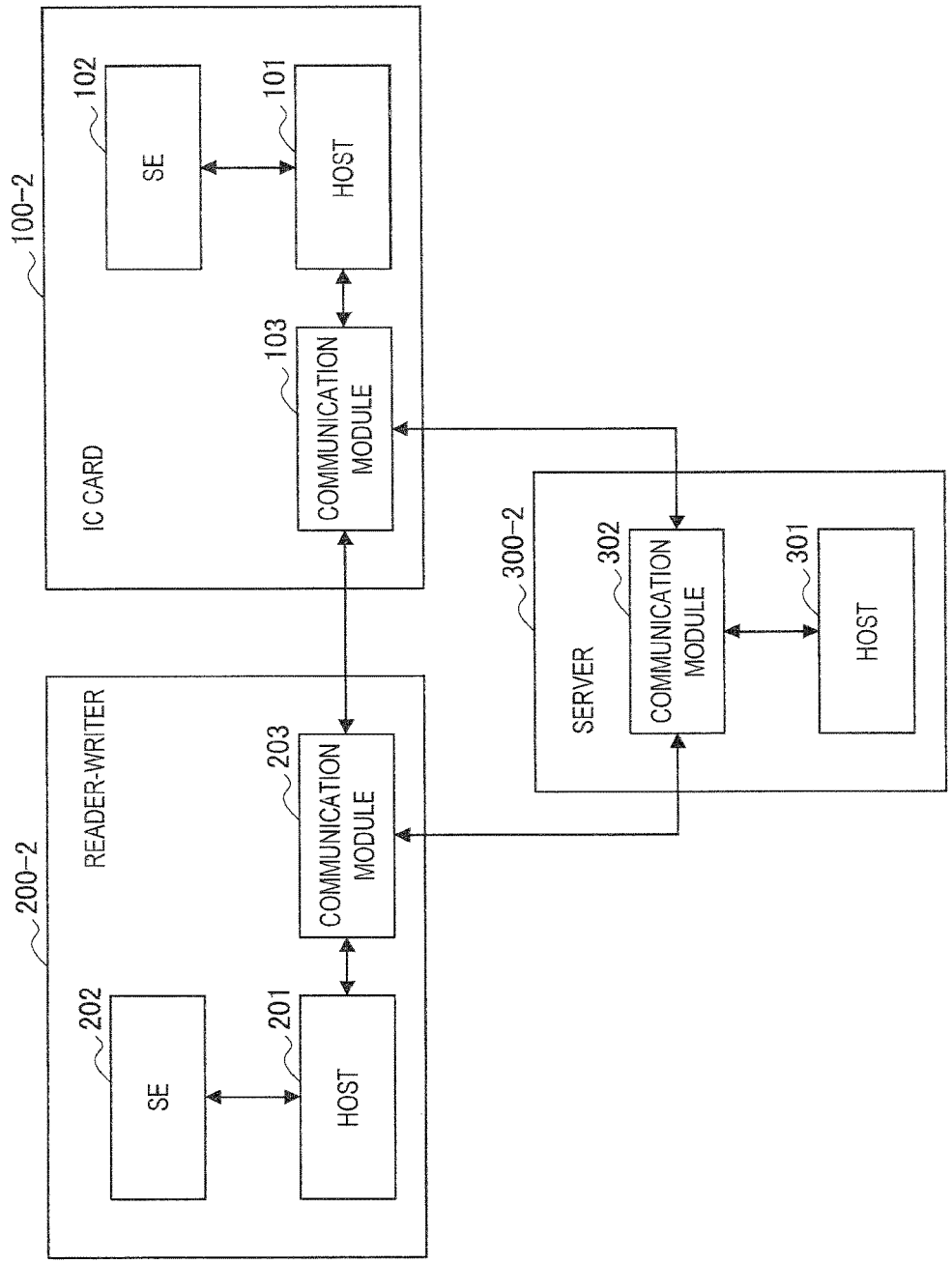
FIG. 11 is a block diagram showing an example of a schematic functional configuration of a communication system in accordance with a second embodiment of the present disclosure.

First, a functional configuration of the communication system in accordance with the second embodiment of the present disclosure will be described with reference to FIG. 11. FIG. 11 is a block diagram showing an example of a schematic functional configuration of a communication system in accordance with a second embodiment of the present disclosure. Only difference in configuration from the communication system in accordance with the first embodiment will be described.

As shown in FIG. 11, the communication system in accordance with the present embodiment includes a server 300-2 in addition to an IC card 100-2 and a reader-writer 200-2.
(Server)
As shown in FIG. 11, the server 300-2 at least includes a host 301 and a communication module 302. Like the IC card 100-2 and the reader-writer 200-2, the server 300-2 may further include an SE. Also, since basic functions of the host 301 and the communication module 302 are substantially the same as basic functions of the host 101 (201) and the communication module 103 (203) of the IC card 100-2 and the reader-writer 200-2, the description will be omitted.

3-2. Functionality of System

Next, functionality of the communication system in accordance with the second embodiment of the present disclosure will be described. Description of functions which are substantially the same as functions of the communication system in accordance with the first embodiment will be omitted.
(C. Registration of entity key)
In the communication system in accordance with the present embodiment, an individual key for each communication device (referred to as an entity key below) is registered. Specifically, the server 300-2 generates an entity key for the communication device 100-2 or the communication device 200-2 (referred to as the communication device 100-2 (200-2) below) and transmits information including the generated entity key (referred to as entity key information below) to the communication device 100-2 (200-2). Here, the entity key is generated not to overlap other entity keys. Also, the server 300-2 manages the generated entity key.

The communication device 100-2 (200-2) receives the entity key information and stores the entity key included in the entity key information. For example, the entity key may be stored like a service key or a macro key, or may be stored separately from these keys. Specifically, entity key information including a temporary entity key is received first, and the entity key information including the entity key which will be registered is subsequently received. Description of a registration process employing the temporary entity key will be omitted below.

(D. Registration of Entity Authentication Key)

In the communication system in accordance with the present embodiment, an entity authentication key generated from an entity key is registered. Specifically, the server 300-2 generates an entity authentication key based on the entity key and unique information of the communication device 100-2 (200-2) (referred to as unique information below) and transmits information including the generated entity authentication key (referred to as entity authentication key information below) to the communication device 100-2 (200-2). For example, the server 300-2 generates the entity authentication key by encrypting secret information, such as a customer number and the like, with the entity key.

When the entity authentication key information is received, the communication device 100-2 (200-2) stores the entity authentication key included in the entity authentication key information. For example, like an entity key, the entity authentication key may be stored like a service key or a macro key, or may be stored separately from these keys.

The unique information may be stored in advance in the communication device 100-2 (200-2), or may be stored upon registration of the entity authentication key. For example, the unique information is included in the entity authentication key information transmitted from the server 300-2, and when the entity authentication key information is received, the communication device 100-2 (200-2) stores the unique information included in the entity authentication key information.

(E. Authentication Based on Entity Key)

In the communication system in accordance with the present embodiment, an authentication process based on an entity key is performed. Specifically, the communication device 100-2 (200-2) acquires unique information from the communication counterpart. Next, the communication device 100-2 (200-2) generates an entity authentication key based on the acquired unique information and an entity key. Then, the communication device 100-2 (200-2) performs an authentication process using the generated entity authentication key.

For example, after completing access authentication to unique information, the communication device 100-2 (200-2) demands unique information from a device which is the communication counterpart. When unique information is acquired in response to the demand, the communication device 100-2 (200-2) generates an entity authentication key by encrypting the unique information with an entity key thereof. Then, using the generated entity authentication key, the communication device 100-2 (200-2) performs an authentication process as described in the first embodiment.

3-3. Process of System

Figure 12:
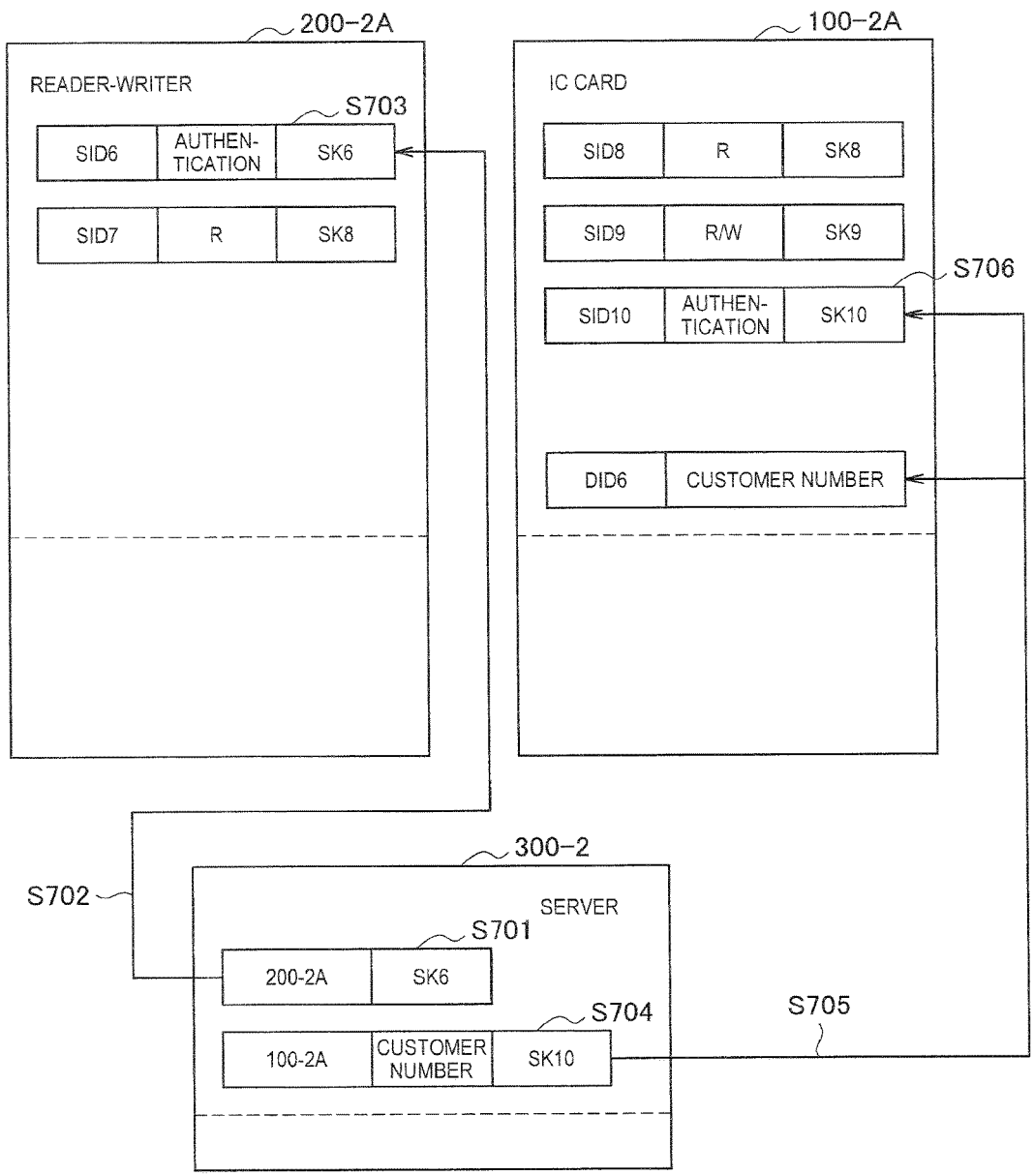
FIG. 12 is a diagram illustrating a registration process of an entity key and an entity authentication key.
Figure 13:
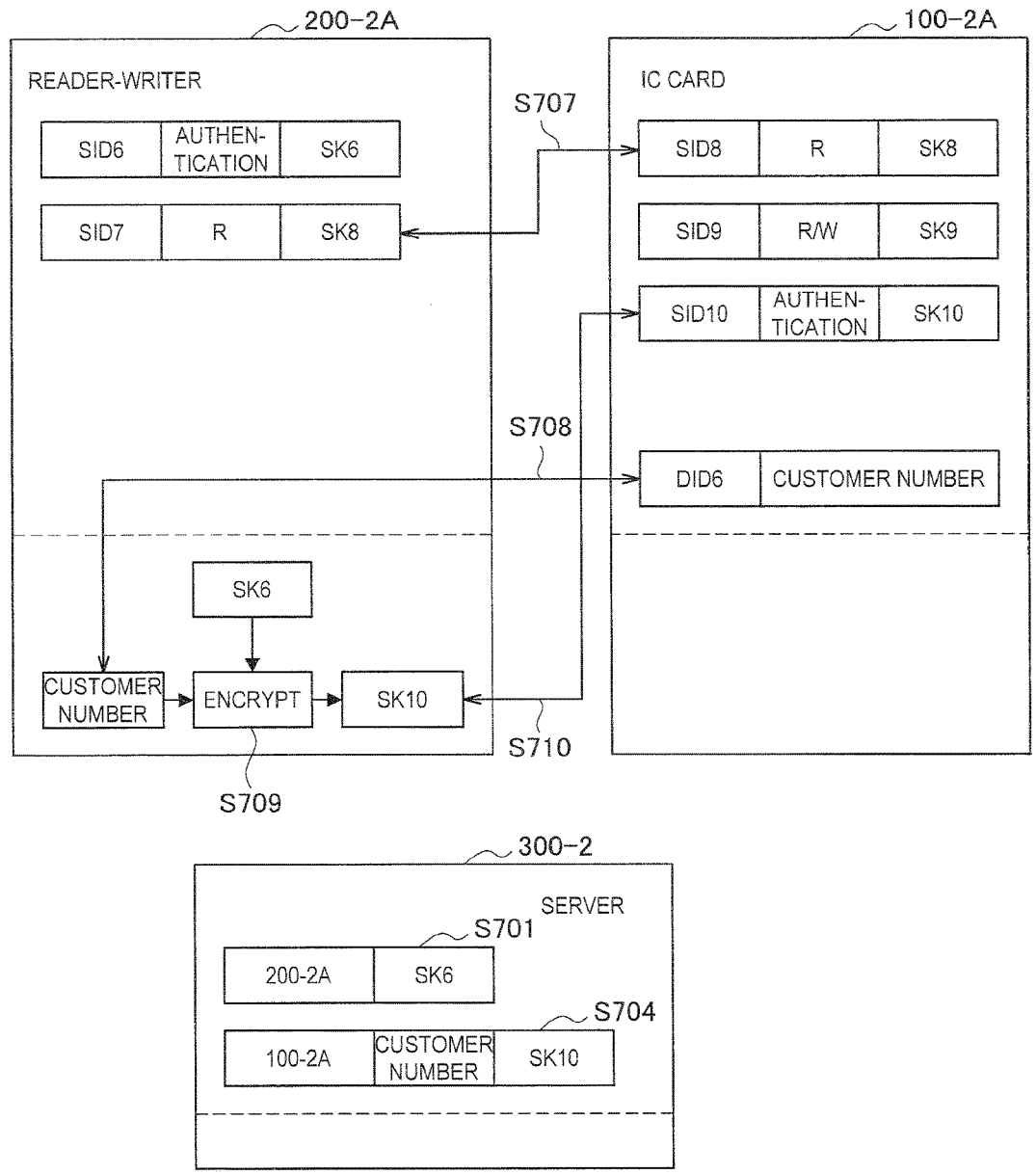
FIG. 13 is a diagram illustrating an authentication process based on an entity key.

Next, processes of a communication system in accordance with the present embodiment will be described with reference to FIG. 12 and FIG. 13. FIG. 12 is a diagram illustrating a registration process of an entity key and an entity authentication key, and FIG. 13 is a diagram illustrating an authentication process based on an entity key. A portion above a dashed line of each component of the communication system shows stored content, and a portion below the dashed line shows processing content.

(C. Registration Process of Entity Key)

First, the server 300-2 generates an entity key (step S701). Specifically, the server 300-2 generates an entity key SK6 for a reader-writer 200-2A.

Next, the server 300-2 transmits entity key information including the entity key (step S702). Specifically, the server 300-2 transmits entity key information including the generated entity key SK6 to the reader-writer 200-2A.

The reader-writer 200-2A which has received the entity key information stores the entity key included in the entity key information (step S703). Specifically, when the entity key information is received, the reader-writer 200-2A stores SK6 included in the entity key information as an entity key thereof. Also, entity key identification information for specifying the entity key may be set, and the entity key may be stored together with the entity key identification information. For example, entity key identification information SID6 for specifying SK6 and SK6 may be made to correspond to each other and stored.

(D. Registration Process of Entity Authentication Key)

The server 300-2 generates an entity authentication key (step S704). Specifically, the server 300-2 generates an entity authentication key SK10 for the IC card 100-2A. At this time, information, such as a customer number and the like, may be generated as unique information. The entity authentication key SK10 is generated from the entity key SK6 and the customer number.

Next, the server 300-2 transmits entity authentication key information (step S705). Specifically, the server 300-2 transmits entity authentication key information including the generated SK10 to the IC card 100-2A. When a customer number is generated, the customer number may be included in the entity authentication key information.

The IC card 100-2 which has received the entity authentication key information stores the entity authentication key included in the entity authentication key information (step S706). Specifically, when the entity authentication key information is received, the IC card 100-2A stores SK10 included in the entity authentication key information as an entity authentication key. When a customer number is included in the entity authentication key information, the IC card 100-2A may store the customer number as information assigned thereto.

(E. Authentication process based on entity key)

The reader-writer 200-2A and the IC card 100-2A perform an authentication process for reading out unique information from the IC card 100-2A (step S707). Specifically, the reader-writer 200-2A transmits SID8 which is a service ID relating to reading of a customer number to the IC card 100-2A, and the IC card 100-2A specifies SK8 which is a service key specified by the SID8. Then, the IC card 100-2A and the reader-writer 200-2A mutually perform an authentication process using SK8. When the authentication succeeds, the reader-writer 200-2 is permitted to read service content, that is, the customer number, corresponding to SID8 which is the service ID relating to SK8. Although not shown in the drawings, SID8 is made to correspond to DID6 which is a data ID for the customer number.

Next, the reader-writer 200-2A reads out unique information from the IC card 100-2A (step S708). Specifically, when the authentication succeeds, the reader-writer 200-2A demands a readout of the customer number which is data corresponding to DID6 from the IC card 100-2A. In response to the demand, the IC card 100-2A provides the customer number to the reader-writer 200-2A.

Next, the reader-writer 200-2A generates an entity authentication key based on the unique information and an entity key (step S709). Specifically, the reader-writer 200-2A designates SID6 and sets an authentication key to the entity key SK6. Subsequently, the reader-writer 200-2A generates the entity authentication key SK10 through an encryption process employing the provided customer information and the set entity key SK6 as inputs.

Next, the reader-writer 200-2A and the IC card 100-2A perform an entity authentication process using the entity authentication key (step S710). Specifically, the reader-writer 200-2A and the IC card 100-2A perform an entity authentication process using the generated SK10. For example, the reader-writer 200-2A generates a random number 1 and transmits a demand for entity authentication including the random number 1 to the IC card 100-2A. When the demand for entity authentication is received, the IC card 100-2A generates a random number 2 and encrypts information including the random number 1 and the random number 2 with the stored entity authentication key SK10. Then, the IC card 100-2A transmits the encrypted information to the reader-writer 200-2A. When the encrypted information is received, the reader-writer 200-2A decrypts the encrypted information with SK10 which has been generated from the customer number for the IC card 100-2A that is a target of the demand for entity authentication. Then, the reader-writer 200-2A determines whether or not the random number 1 is in the decrypted information. When the random number 1 is included, it is determined that the authentication has succeeded. Also, mutual authentication may be performed as described in the first embodiment.

3-4. Summary of Present Embodiment

As described above, according to the second embodiment of the present disclosure, the communication device 100-2 (200-2) stores an entity key generated for the communication device 100-2 (200-2) and performs an authentication process for a device of a communication destination using an entity authentication key generated from the entity key and unique information of the device of the communication destination. Also, the communication device 100-2 (200-2) stores an entity authentication key, which is generated from unique information of the communication device 100-2 (200-2) and an entity key of the device of the communication destination, and the unique information, and performs an authentication process for the device of the communication destination using the entity authentication key. For this reason, the entity authentication key used for authentication is generated from an entity key generated for each of the communication device 100-2 (200-2), so that even when the corresponding entity key of a particular communication device 100-2 (200-2) leaks, an authentication process for the other communication device 100-2 (200-2) is not affected. Accordingly, it is possible to improve the safety of the overall communication system. Also, the above case is settled by stopping and reissuing the entity key for only the particular communication device 100-2 (200-2) whose entity key has leaked. In other words, a change of the entity key of the other communication device 100-2 (200-2) can be avoided. Accordingly, it is possible to reduce a recovery operation for the information leakage.

4. THIRD EMBODIMENT OF PRESENT DISCLOSURE (APPLICATION TO LOGICAL ACCESS CONTROL)

The communication system in accordance with the second embodiment of the present disclosure has been described above. Next, a communication system in accordance with a third embodiment of the present disclosure will be described. The communication system in accordance with the present embodiment includes an application which performs logical access control according to an authentication result.

4-1. Configuration of System

Figure 14:
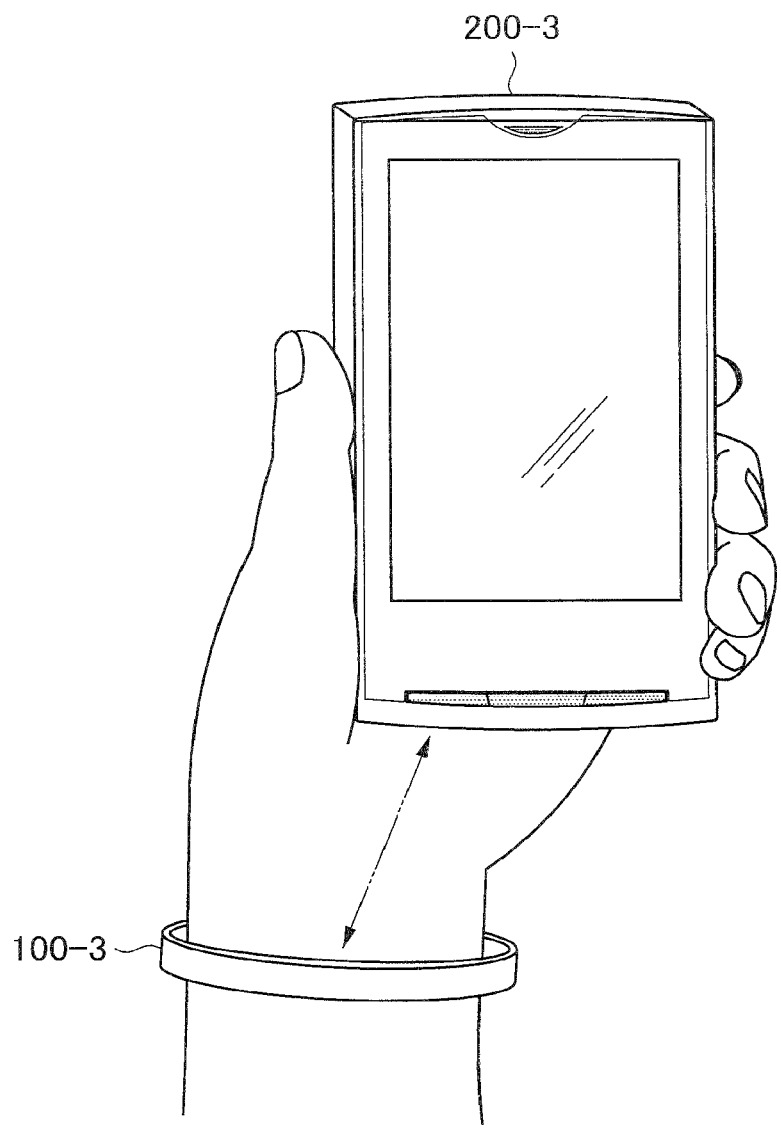
FIG. 14 is a diagram showing an example of a schematic physical configuration of a communication system in accordance with a third embodiment of the present disclosure.

First, an example of a physical configuration of the communication system in accordance with the third embodiment of the present disclosure will be described with reference to FIG. 14. FIG. 14 is a diagram showing an example of a schematic physical configuration of the communication system in accordance with the third embodiment of the present disclosure. Description of the configuration which is substantially the same as the functional configuration of the communication device 100 (200) in the embodiment described above will be omitted.

As shown in FIG. 14, the communication system in accordance with the present embodiment includes a wearable device 100-3 and a portable terminal 200-3. Functional configurations of the wearable device 100-3 and the portable terminal 200-3 include substantially the same configuration as the functional configuration of the communication device 100 (200) in the embodiment described above. In the present embodiment, the communication module 103 (203) performs human body communication.

(Wearable Device)

The wearable device 100-3 is a communication device in the form of a band worn by a user. Specifically, the wearable device 100-3 performs authentication and data communication with another communication device using human body communication. The wearable device 100-3 may further have an information detecting function. For example, the wearable device 100-3 may have a function of measuring inertial information, such as an acceleration, an angular velocity, or the like, or bio-information, such as a body temperature, a pulse, or the like. Also, the wearable device 100-3 may be a device integrated with an article for decoration, such as a band as shown in FIG. 14 or a necklace which is not shown in the drawing, or may be a physical key of a car, a house, or the like, or a device, such as a dongle having a software key.

(Portable Terminal)

The portable terminal 200-3 includes an application as a processing unit. Specifically, the application controls logical access of the user to the portable terminal 200-3. For example, the portable terminal 200-3 is an information communication terminal, such as a smart phone or the like, and the application performs lock control for a display screen of the smart phone. While the display screen is locked, the user is not able to make any input to the smart phone or an input other than some inputs, such as an input for releasing the lock and the like.

4-2. Functionality of System

Next, functionality of the communication system in accordance with the third embodiment of the present disclosure will be described. Description of a function which is substantially the same as a function of the communication system in accordance with the first or second embodiment will be omitted.

The portable terminal 200-3 performs a process according to a result of authentication with another communication device. Specifically, a host 201 performs an authentication process with another communication device through human body communication, and the application controls logical access according to a result of the authentication process. More specifically, when a manipulation of the portable terminal 200-3 is detected by a separately provided manipulation detecting unit, the host 201 causes a communication module 203 to search for a communication device. When a communication device is found by the search, the host 201 causes an SE 202 to perform an authentication process with the communication device. Then, the application performs lock control of a display screen in the portable terminal 200-3 according to a result of the authentication process. For example, when the authentication with the wearable device 100-3 succeeds, the application releases a lock of the display screen of the portable terminal 200-3.

4-3. Process of System

Figure 15:
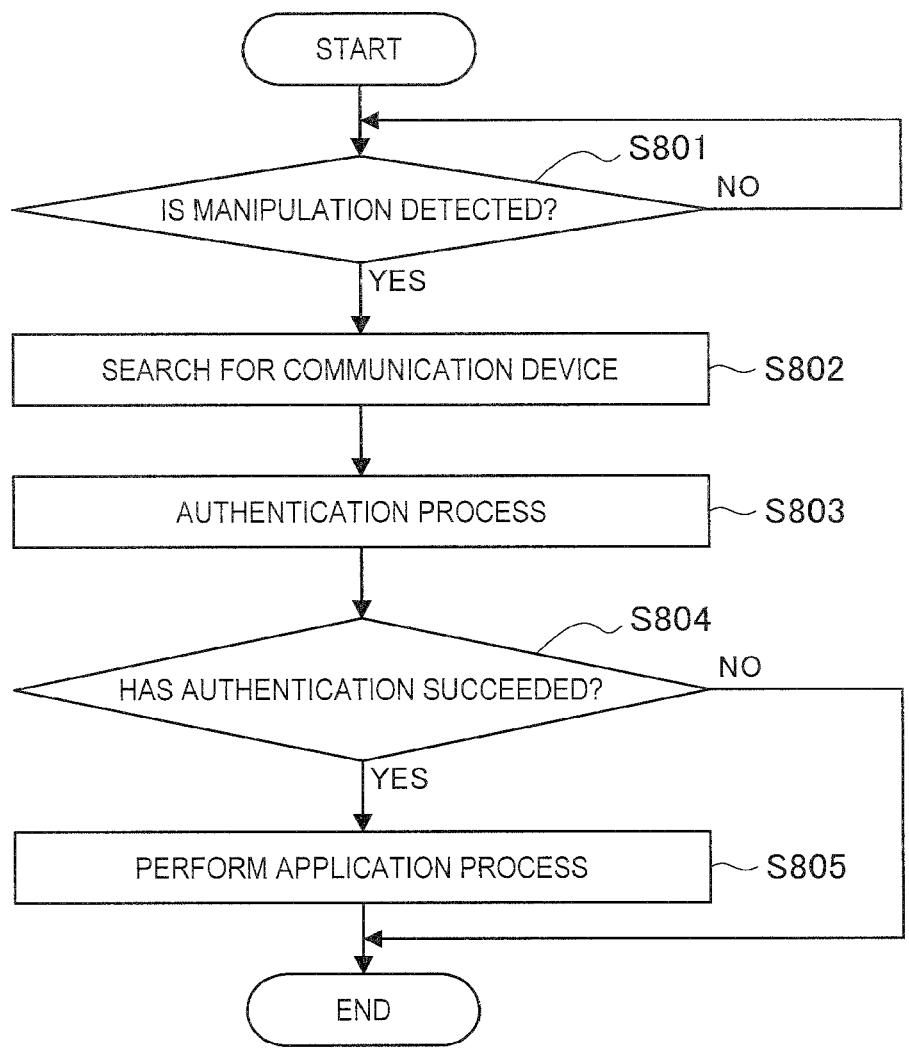
FIG. 15 is a flowchart conceptually showing a process of a portable terminal based on an authentication result of the communication system in accordance with the third embodiment.

Next, a process of the communication system in accordance with the present embodiment will be described with reference to FIG. 15. FIG. 15 is a flowchart conceptually showing a process of a portable terminal based on an authentication result of the communication system in accordance with the present embodiment.

The portable terminal 200-3 determines whether or not there is a manipulation (step S801). Specifically, the host 201 determines whether a manipulation of the portable terminal 200-3, for example, a touch manipulation on a display unit, is detected by the manipulation detecting unit.

When it is determined that a manipulation has been detected, the portable terminal 200-3 searches a communication device (step S802). Specifically, when it is determined that a manipulation of the portable terminal 200-3 has been detected by the manipulation detecting unit, the host 201 causes the communication module 203 to search for a communication device in human body communication.

Next, the portable terminal 200-3 performs an authentication process with the found communication device (step S803). Specifically, when the wearable device 100-3 is found by the search, the host 201 causes the SE 202 to perform an authentication process with the wearable device 100-3.

Next, the portable terminal 200-3 determines whether or not the authentication has succeeded (step S804). Specifically, the host 201 determines whether the authentication with the wearable device 100-3 performed by the SE 202 has succeeded.

When it is determined that the authentication has succeeded, the portable terminal 200-3 executes an application process (step S805). Specifically, when it is determined that the authentication by the SE 202 has succeeded, the host 201 provides the authentication result to the application. Then, the application releases a lock of the display screen.

When the authentication has failed, the portable terminal 200-3 is terminated without executing an application process. Also, when the authentication has failed, another application process may be executed. Specifically, when the authentication has failed, the application performs lock control based on an input of the user instead of lock control based on the authentication result. For example, lock control based on an input of the user may be lock control based on a pass code input, a fingerprint input, or an iris input.

4-4. Summary of Present Embodiment

As described above, according to the third embodiment of the present disclosure, the communication device 100-3 (200-3) further includes a processing unit which performs a process depending on an authentication result of an authentication process. For this reason, even when the user does not perform an input manipulation for authentication, it is possible to execute the application for only the permitted user. Accordingly, it is possible to achieve both convenience and safety.

Also, the application performs logical access control for the communication device 100-3 (200-3). In recent years, logical access, for example, login to an information communication terminal and the like, has become performed commonly. For this reason, according to the present configuration, by using a result of an authentication process, it is possible to omit an effort of the user for a login input while ensuring the safety of an information communication terminal.

5. FOURTH EMBODIMENT OF PRESENT DISCLOSURE (APPLICATION TO PHYSICAL ACCESS CONTROL)

The communication system in accordance with the third embodiment of the present disclosure has been described above. Next, a communication system in accordance with a fourth embodiment of the present disclosure will be described. The communication system in accordance with the present embodiment includes an application which performs physical access control according to an authentication result.

5-1. Configuration of System

Figure 16:
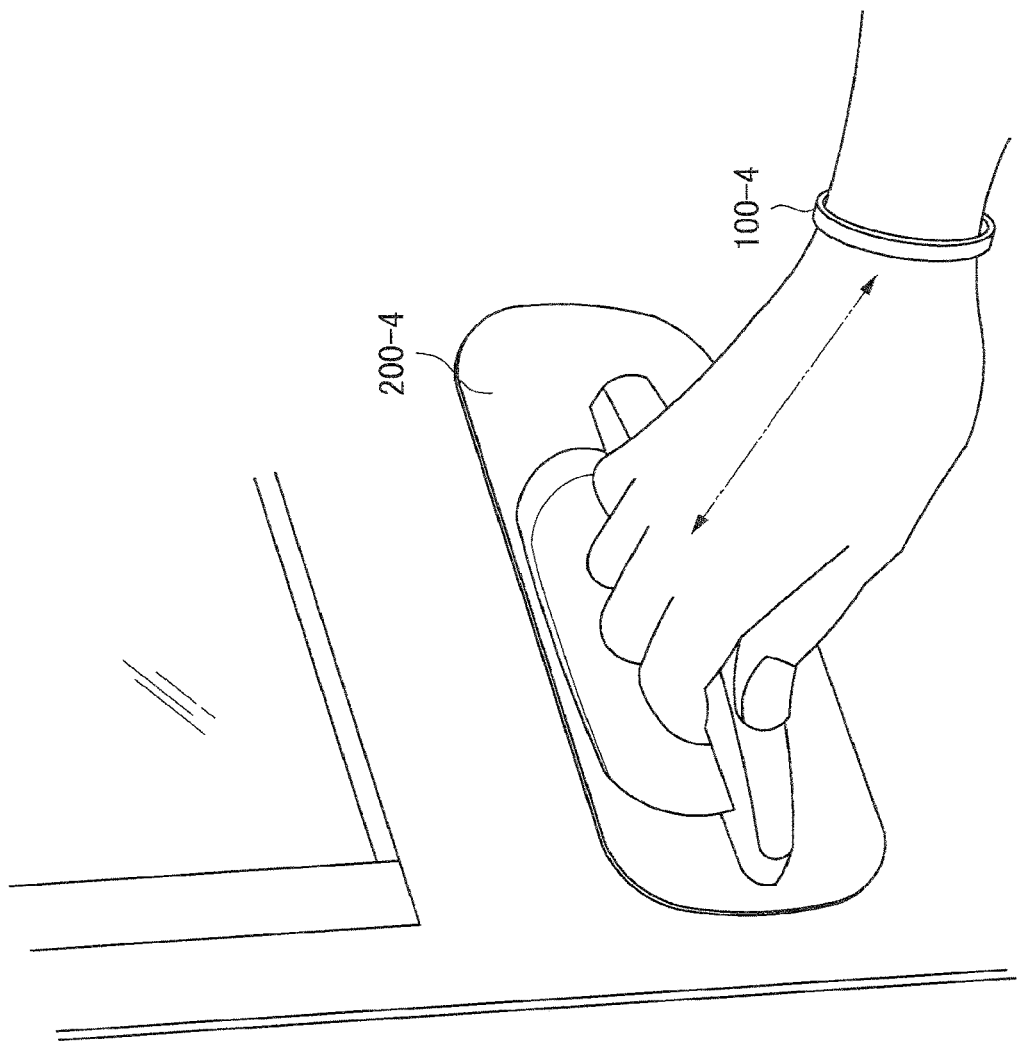
FIG. 16 is a diagram showing an example of a schematic physical configuration of a communication system in accordance with a fourth embodiment of the present disclosure.

First, an example of a physical configuration of the communication system in accordance with the fourth embodiment of the present disclosure will be described with reference to FIG. 16. FIG. 16 is a diagram showing an example of a schematic physical configuration of the communication system in accordance with the fourth embodiment of the present disclosure. Description of the configuration which is substantially the same as the functional configuration of the communication device 100 (200) in the embodiment described above will be omitted.

As shown in FIG. 16, the communication system in accordance with the present embodiment includes a wearable device 100-4 and a door device 200-4. Functional configurations of the wearable device 100-4 and the door device 200-4 include substantially the same configuration as the functional configuration of the communication device 100 (200) in the embodiment described above.

(Door Device)

The door device 200-4 includes an application which controls physical access. Specifically, the application controls physical access of a user to the door device 200-4. For example, the door device 200-4 is a door of a building, such as a house or the like, or a vehicle, such as a car or the like, and the application performs lock control of the door. The door device 200-4 may be integrated with the door, or may be connected to a control module which is provided separately from the door and controls a lock mechanism of the door device 200-4.

5-2. Functionality of System

Next, functionality of the communication system in accordance with the fourth embodiment of the present disclosure will be described. Description of a function which is substantially the same as a function of the communication system in accordance with any of the first to third embodiments will be omitted.

The door device 200-4 performs physical access control according to a result of authentication with another communication device. Specifically, a host 201 performs an authentication process with another communication device through human body communication, and the application controls physical access according to a result of the authentication process. More specifically, when a manipulation of the door device 200-4 is detected by a separately provided manipulation detecting unit, the host 201 causes a communication module 203 to search for a communication device. When a communication device is found by the search, the host 201 causes an SE 202 to perform an authentication process with the communication device. Then, the application performs lock control of the door according to a result of the authentication process. For example, when the authentication with the wearable device 100-4 succeeds, the application releases a lock of the door corresponding to the door device 200-4.

5-3. Process of System

In terms of access control, a process of the communication system in accordance with the fourth embodiment of the present disclosure is substantially the same as a process of the communication system in accordance with the third embodiment of the present disclosure, and thus the description will be omitted.

5-4. Summary of Present Embodiment

As described above, according to the fourth embodiment of the present disclosure, the communication device 100-4 (200-4) controls physical access to the communication device 100-4 (200-4) according to a result of an authentication process. In order to open a door, in general, a user first releases a lock of the door using a key or the like and then manipulates a door knob. At this time, it may be annoying for a user having a burden and the like to release the lock using the key or the like. Meanwhile, according to the present embodiment, it is possible to omit an effort of a user to release a door lock using a result of an authentication process. Further, when human body communication is used in the authentication process, the authentication process is simplified for the user, and it is possible to improve convenience.

6. HARDWARE CONFIGURATION OF COMMUNICATION DEVICE IN ACCORDANCE WITH EMBODIMENT OF PRESENT DISCLOSURE

The communication device 100 (200) in accordance with each embodiment of the present disclosure has been described above. The process of the communication device 100 (200) described above is implemented by cooperation between software and the hardware of the communication device 100 (200) described below.

Figure 17:
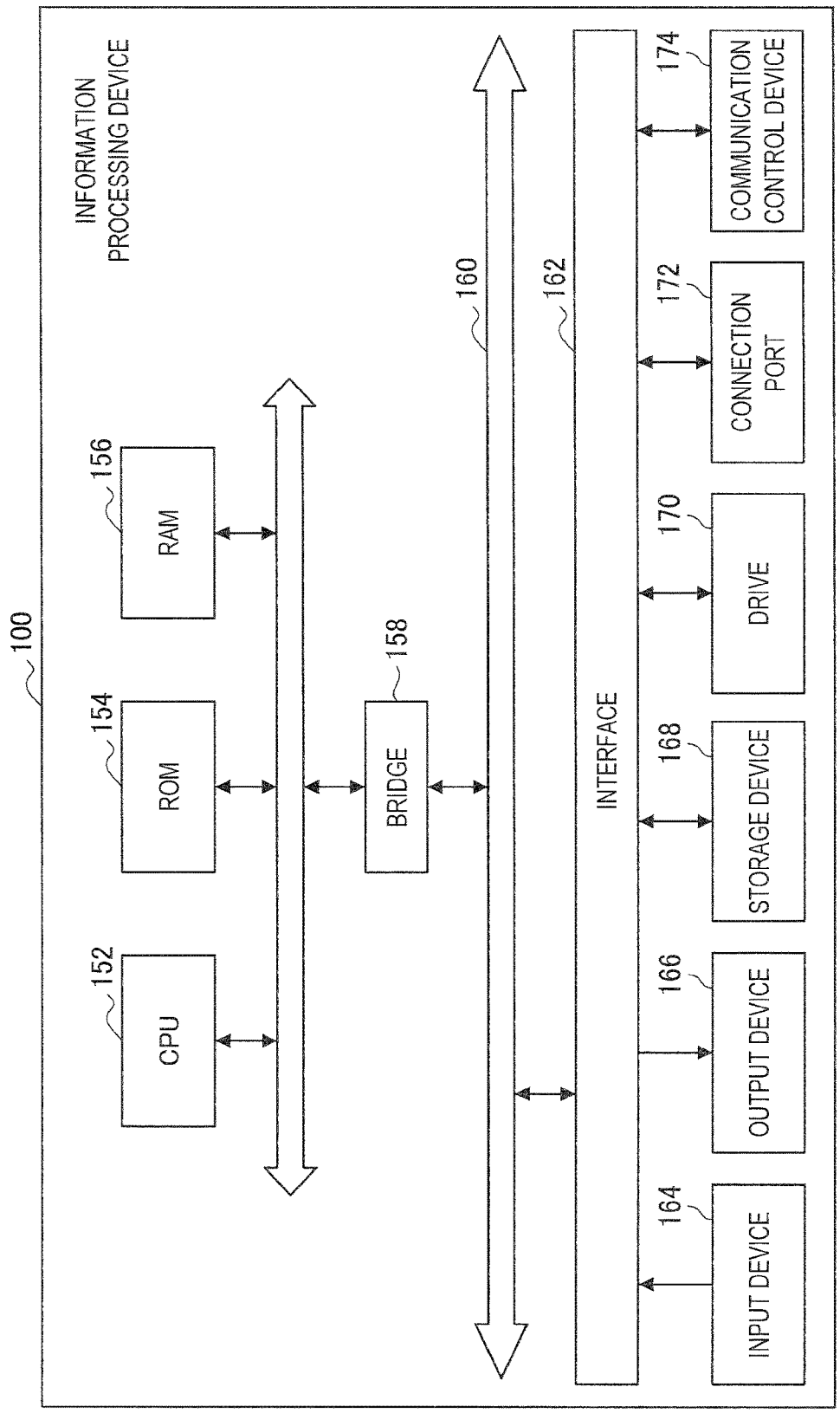
FIG. 17 is an explanatory diagram showing a hardware configuration of a communication device in accordance with an embodiment of the present disclosure.

FIG. 17 is an explanatory diagram showing a hardware configuration of the communication device 100 (200) in accordance with an embodiment of the present disclosure. As shown in FIG. 17, the communication device 100 (200) includes a central processing unit (CPU) 152, a read only memory (ROM) 154, a random access memory (RAM) 156, a bridge 158, a bus 160, an interface 162, an input device 164, an output device 166, a storage device 168, a drive 170, a connection port 172, and a communication control device 174. A part of the configuration may be omitted.

The CPU 152 functions as an arithmetic processing device, and implements operation of the host 101 (201) and the SE 102 (202) in the communication device 100 (200) in cooperation with various programs. The host 101 (201) and the SE 102 (202) may operate with different CPUs. Also, the CPU 152 may be a microprocessor. The ROM 154 stores programs, arithmetic parameters, or the like used by the CPU 152. The RAM 156 temporarily stores programs used in execution of the CPU 152, parameters properly changed in the execution, or the like. A part of a storage unit in the communication device 100 (200) is implemented by the ROM 154 and the RAM 156. The CPU 152, the ROM 154, and the RAM 156 are mutually connected by an internal bus configured by a CPU bus or the like.

The input device 164 includes an input section, for example, a mouse, a keyboard, a touch panel, a button, a microphone, a switch, and a lever, used for the user to input information and an input control circuit which generates an input signal based on an input by the user and outputs the input signal to the CPU 152. The user of the communication device 100 (200) can input various kinds of data or give an instruction of a processing operation to the communication device 100 (200) by manipulating the input device 164.

The output device 166 performs output to a device, such as a projector, a liquid crystal display (LCD) device, an organic light emitting diode (OLED) device, or a lamp. Further, the output device 166 may output sound of a speaker, a headphone, and the like.

The storage device 168 is a device for data storage. The storage device 168 may include a storage medium, a recording device which records data on a storage medium, a readout device which reads out data from a storage medium, a deletion device which deletes data recorded on a storage medium, and the like. The storage device 168 stores programs executed by the CPU 152 and various kinds of data.

The drive 170 is a reader-writer for storage media, and is embedded in the communication device 100 (200) or attached to the outside. The drive 170 reads out information recorded in a mounted removable storage medium, such as a magnetic disk, an optical disk, a magneto-optical disk, a semi conductor memory, or the like, and outputs the read information to the RAM 154. Also, the drive 170 may write information on the removable storage medium.

The connection port 172 is, for example, an information processing device outside the communication device 100 (200) or a bus for connecting to a peripheral device. Also, the connection port 172 may be a universal serial bus (USB).

As an example of the communication module 103 (203) in the communication device 100 (200), the communication control device 174 is, for example, a communication interface configured with a communication device for connecting to a network. Although the communication control device 174 is generally a device corresponding to human body communication, the communication control device 174 may also be a device corresponding to short-range wireless communication, a device corresponding to infrared communication, a device corresponding to Long Term Evolution (LTE) communication, or a device corresponding to wired communication which performs communication in a wired manner.

7. CONCLUSION

According to the first embodiment of the present disclosure, by performing the authentication processes using the macro key stored in advance, it is possible to omit a macro key generation process from the authentication process. Accordingly, it is possible to reduce time taken for the authentication process. In related art, a plurality of service IDs are provided to generate a macro key. In contrast, according to the present embodiment, one macro ID instead of a plurality of service IDs is provided. Since the macro ID has less amount of information than the plurality of service IDs, the amount of communication is reduced. Accordingly, it is possible to reduce communication time taken to provide information for generating the macro key.

According to the second embodiment of the present disclosure, the entity authentication key used for authentication is generated from an entity key generated for each of the communication device 100 (200), so that even when the corresponding entity key of a particular communication device 100 (200) leaks, an authentication process for the other communication device 100 (200) is not affected. Accordingly, it is possible to improve the safety of the overall communication system. Also, the above case is settled by stopping and reissuing the entity key for only the particular communication device 100 (200) whose entity key has leaked. In other words, a change of the entity key of the other communication device 100 (200) can be avoided. Accordingly, it is possible to reduce a recovery operation for the information leakage.

According to the third embodiment of the present disclosure, even when the user does not perform an input manipulation for authentication, it is possible to execute the application for only the permitted user. Accordingly, it is possible to achieve both convenience and safety.

According to the fourth embodiment of the present disclosure, it is possible to omit an effort of a user to release a door lock using a result of an authentication process. Further, when human body communication is used in the authentication process, the authentication process is simplified for the user, and it is possible to improve convenience.

It should be understood by those skilled in the art that various modifications, combinations, sub-combinations and alterations may occur depending on design requirements and other factors insofar as they are within the scope of the appended claims or the equivalents thereof.

For example, in the above embodiments, a lock of a display screen of a smart phone is released according to an authentication result, but the present technology is not limited to such an example. Specifically, a process performed according to the corresponding authentication result may be access to secret information of a communication device, such as a smart phone or the like, or a billing process. For example, the body, the destination, or the like of email are examples of secret information, and browsing or a change of these pieces of information is performed according to a result of an authentication process.

Also, in the above embodiments, an example in which one macro ID is communicated has been described, but a plurality of macro IDs may be communicated in one authentication process.

Further, the effects described in this specification are merely illustrative or exemplified effects, and are not limitative. That is, with or in the place of the above effects, the technology according to the present disclosure may achieve other effects that are clear to those skilled in the art based on the description of this specification.

The steps illustrated in the flowcharts or sequence diagrams in the above-described embodiment naturally include processes performed in the described and chronological order, and further include processes that are not necessarily performed in chronological order, but are also performed in parallel or are individually performed. It is also possible to change the order as necessary even in the steps for chronologically performing the processes.

Additionally, the present technology may also be configured as below.

(1) A communication device including:
a storage unit configured to store an authentication key generated from a plurality of keys;
a communication unit configured to receive authentication key identification information for specifying the authentication key; and
an authentication unit configured to perform an authentication process for a transmission source of the authentication key identification information using the authentication key specified from the storage unit based on the authentication key identification information.

(2) The communication device according to (1),
wherein the authentication process includes a process for authenticating the communication device by the transmission source of the authentication key identification information.

(3) The communication device according to (2),
wherein the authentication key identification information is included in first information received by the communication unit, and
the authentication unit encrypts second information including a first random number included in the first information using the specified authentication key, and causes the communication unit to transmit the encrypted second information.

(4) The communication device according to (3),
wherein the authentication process includes a process for authenticating the transmission source of the authentication key identification information by the communication device.

(5) The communication device according to (4),
wherein the authentication unit
generates a second random number and causes the communication unit to transmit the second information including the second random number, and decrypts third information received by the communication unit with the specified authentication key, and determines whether or not the second random number is in the third information obtained through the decryption.

(6) The communication device according to any one of (1) to (5),
wherein, when a demand for authentication key registration including key identification information for specifying the keys and the authentication key identification information is received, the authentication key is generated from the keys specified by the key identification information, and
the storage unit stores the generated authentication key.

(7) The communication device according to (6),
wherein the demand for authentication key registration includes determination information for determining validity of information, the determination information being generated for the authentication key identification information and the key identification information included in the demand for authentication key registration.

(8) The communication device according to any one of (1) to (7),
wherein the authentication process is performed using the authentication key generated based on key identification information for specifying the received keys, and
the storage unit stores the authentication key generated in the authentication process.

(9) The communication device according to (8),
wherein the storage unit stores the authentication key generated in the authentication process based on reception of a demand for authentication key registration.

(10) The communication device according to any one of (1) to (9),
wherein the storage unit deletes the authentication key when a predetermined condition is satisfied.

(11) The communication device according to any one of (1) to (10),
wherein, when the authentication process succeeds, the authentication unit permits the transmission source of the authentication key identification information to access data made to correspond to key identification information for specifying the keys.

(12) A communication device including:
a communication unit configured to transmit authentication key identification information for specifying an authentication key generated from a plurality of keys;
a storage unit configured to store the authentication key; and
an authentication unit configured to perform an authentication process for a transmission destination of the authentication key identification information using the stored authentication key.

(13) The communication device according to (12),
wherein the communication unit transmits a demand for authentication key registration including key identification information for specifying the keys and the authentication key identification information.

(14) The communication device according to (13),
wherein the authentication key identification information included in the demand for authentication key registration does not overlap authentication key identification information already in use.

(15) The communication device according to any one of (12) to (14), further including:
a processing unit configured to perform a process according to an authentication result in the authentication process.

(16) The communication device according to (15),
wherein, when the authentication process succeeds, the processing unit accesses data stored in the transmission destination of the authentication key identification information and made to correspond to key identification information for specifying the keys.

(17) The communication device according to any one of (12) to (16),
wherein the communication unit communicates using human body communication.

(18) A communication method including:
storing, by a processor, an authentication key generated from a plurality of keys;
receiving, by the processor, authentication key identification information for specifying the authentication key; and
performing, by the processor, an authentication process for a transmission source of the authentication key identification information using the authentication key specified based on the authentication key identification information.

(19) A communication method including:
transmitting, by a processor, authentication key identification information for specifying an authentication key generated from a plurality of keys;
storing, by the processor, the authentication key; and
performing, by the processor, an authentication process for a transmission destination of the authentication key identification information using the stored authentication key.

(20) A communication system including:
a first communication device; and
a second communication device,
wherein the first communication device includes
a communication unit configured to transmit authentication key identification information for specifying an authentication key generated from a plurality of keys,
a storage unit configured to store the authentication key, and
an authentication unit configured to perform an authentication process for a transmission destination of the authentication key identification information using the stored authentication key, and
the second communication device includes
a storage unit configured to store the authentication key generated from the plurality of keys,
a communication unit configured to receive the authentication key identification information for specifying the authentication key, and
an authentication unit configured to perform an authentication process for a transmission source of the authentication key identification information using the authentication key specified from the storage unit based on the authentication key identification information.

What is claimed is:

1. A communication device comprising:
a computer memory and configured to store an authentication key generated from a plurality of keys;
a wireless transceiver and configured to receive authentication key identification information for specifying the authentication key; and
a processor configured to perform an authentication process for a transmission source of the authentication key identification information using the authentication key specified from the computer memory based on the authentication key identification information,
wherein the authentication key is generated and stored in the computer memory before the authentication key identification information is received by the wireless transceiver.

2. The communication device according to claim 1,
wherein the authentication process includes a process for authenticating the communication device by the transmission source of the authentication key identification information.

3. The communication device according to claim 2,
wherein the authentication key identification information is included in first information received by the less transceiver, and
the processor encrypts second information including a first random number included in the first information using the specified authentication key, and causes the wireless transceiver to transmit the encrypted second information.

4. The communication device according to claim 3, wherein the authentication process includes a process for authenticating the transmission source of the authentication key identification information by the communication device.

5. The communication device according to claim 4, wherein the processor generates a second random number and causes the wireless transceiver to transmit the second information including the second random number, and decrypts third information received by the wireless transceiver with the specified authentication key, and determines whether or not the second random number is in the third information obtained through the decryption.

6. The communication device according to claim 1, wherein, when a demand for authentication key registration including key identification information for specifying the keys and the authentication key identification information is received, the authentication key is generated from the keys specified by the key identification information, and the computer memory stores the generated authentication key.

7. The communication device according to claim 6, wherein the demand for authentication key registration includes determination information for determining validity of information, the determination information being generated for the authentication key identification information and the key identification information included in the demand for authentication key registration.

8. The communication device according to claim 1, wherein the authentication process is performed using the authentication key generated based on key identification information for specifying the received keys, and the computer memory stores the authentication key generated in the authentication process.

9. The communication device according to claim 8, wherein the computer memory stores the authentication key generated in the authentication process based on reception of a demand for authentication key registration.

10. The communication device according to claim 1, wherein the computer memory deletes the authentication key when a predetermined condition is satisfied.

11. The communication device according to claim 1, wherein, when the authentication process succeeds, the processor permits the transmission source of the authentication key identification information to access data made to correspond to key identification information for specifying the keys.

12. A communication device comprising:

a wireless transmitter and configured to transmit authentication key identification information for specifying an authentication key generated from a plurality of keys;

a computer memory and configured to store the authentication key; and a processor configured to perform an authentication process for a transmission destination of the authentication key identification information using the stored authentication key, wherein the authentication key is generated and stored in a receiving device that receives the transmitted authentication key identification information, before the authentication key identification information is transmitted by the wireless transceiver.

13. The communication device according to claim 12, wherein the wireless transceiver transmits a demand for authentication key registration including key identification information for specifying the keys and the authentication key identification information.

14. The communication device according to claim 13, wherein the authentication key identification information included in the demand for authentication key registration does not overlap authentication key identification information already in use.

15. The communication device according to claim 12, wherein:

the processor is further configured to perform a process according to an authentication result in the authentication process.

16. The communication device according to claim 15, wherein, when the authentication process succeeds, the processing unit accesses data stored in the transmission destination of the authentication key identification information and made to correspond to key identification information for specifying the keys.

17. The communication device according to claim 12, wherein the wireless transceiver communicates using human body communication.

18. A communication method comprising:

storing; by a processor, an authentication key generated from a plurality of keys;

receiving, by the processor, authentication key identification information for specifying the authentication key; and performing, by the processor, an authentication process for a transmission source of the authentication key identification information using the authentication key specified based on the authentication key identification information, wherein the authentication key is generated and stored before the authentication key identification information is received b the processor.

19. A communication method comprising:

transmitting, by a processor, authentication key identification information for specifying an authentication key generated from a plurality of keys;

storing, by the processor, the authentication key; and performing, by the processor, an authentication process for a transmission destination of the authentication key identification information using the stored authentication key, wherein the authentication key is generated and stored in a receiving device that receives transmitted the authentication key identification information, before the authentication key identification information is transmitted by the processor.

20. A communication system comprising:

a first communication device; and a second communication device, wherein the first communication device includes a wireless transceiver configured to transmit authentication key identification information for specifying an authentication key generated from a plurality of keys, a computer memory configured to store the authentication key, and a processor configured to perform an authentication process for a transmission destination of the authentication key identification information using the stored authentication key, and the second communication device includes a second computer memory configured to store the authentication key generated from the plurality of keys, a second wireless transceiver configured to receive the authentication key identification information for specifying the authentication key, and a second processor configured to perform an authentication process for a transmission source of the authentication key identification information using the authentication key specified from the computer memory based on the authentication key identification information, wherein the authentication key is generated and stored in the second computer memory before the authentication key identification information is received by the second wireless transceiver.

* * * * *